US012791964B2

(12) United States Patent
Okayasu et al.

(10) Patent No.: US 12,791,964 B2
(45) Date of Patent: Nov. 10, 2026

(54) IMAGE FORMING APPARATUS

(71) Applicant: CANON KABUSHIKI KAISHA, Tokyo (JP)

(72) Inventors: Kohei Okayasu, Shizuoka (JP); Takanori Mitani, Kanagawa (JP); Tatsuya Kinukawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/190,183

(22) Filed: Apr. 25, 2025

(65) Prior Publication Data

US 2025/0341797 A1 Nov. 6, 2025

(30) Foreign Application Priority Data

May 2, 2024 (JP) ................................ 2024-074740
May 2, 2024 (JP) ................................ 2024-074741
May 2, 2024 (JP) ................................ 2024-074742

(51) Int. Cl.
*G03G 15/16* (2006.01)
*G03G 15/00* (2006.01)
*G03G 21/06* (2006.01)

(52) U.S. Cl.
CPC ....... *G03G 15/168* (2013.01); *G03G 15/1605* (2013.01); *G03G 15/6558* (2013.01); *G03G 21/06* (2013.01); *G03G 2215/00409* (2013.01)

(58) Field of Classification Search
CPC ........... G03G 15/1675; G03G 15/1605; G03G 15/161
See application file for complete search history.

(56) References Cited

U.S. PATENT DOCUMENTS

2008/0317485 A1* 12/2008 Lee .................... G03G 15/1695 399/45
2018/0224773 A1* 8/2018 Torimaru ............... G03G 21/00
(Continued)

FOREIGN PATENT DOCUMENTS

JP S5934570 A 2/1984
JP H09244433 A 9/1997
JP 2000305381 A 11/2000
(Continued)

*Primary Examiner* — Jessica L Eley
(74) *Attorney, Agent, or Firm* — Canon.U.S.A., Inc. IP Division

(57) ABSTRACT

An image forming apparatus includes a rotatable transfer member configured to be brought into contact with an image bearing member to form a transfer nip portion, and transfer, to a transfer material, toner supplied to a surface of the image bearing member, at the transfer nip portion, an electrostatic charge removal member configured to remove electrostatic charge from a surface of the transfer member at a counter portion facing the transfer member at an upstream of the transfer nip portion in both a rotational direction of the transfer member and a moving direction of the transfer material, and a transfer voltage application unit configured to apply a transfer voltage to the transfer member, wherein the electrostatic charge removal member is arranged in such a manner as to remove electrostatic charge from the transfer member in a state in which the transfer voltage is applied to the transfer member.

46 Claims, 20 Drawing Sheets

(56) References Cited

U.S. PATENT DOCUMENTS

| | | | | |
|---|---|---|---|---|
| 2019/0346793 | A1 | 11/2019 | Watanabe | |
| 2020/0004193 | A1* | 1/2020 | Minagawa | G03G 15/1605 |

FOREIGN PATENT DOCUMENTS

| | | | |
|---|---|---|---|
| JP | 2003066742 | A | 3/2003 |
| JP | 2007052355 | A | 3/2007 |
| JP | 2007052356 | A | 3/2007 |
| JP | 2009204642 | A | 9/2009 |
| JP | 2012053124 | A | 3/2012 |
| JP | 2019197114 | A | 11/2019 |

* cited by examiner

IMAGE FORMING APPARATUS

BACKGROUND

Field

The present disclosure relates to an image forming apparatus such as a printer that uses an electrophotographic method or an electrostatic recording method, a copier, a facsimile apparatus, and a multifunction peripheral.

Description of the Related Art

Some known electrophotographic color image forming apparatuses have a configuration independently including image forming units of a plurality of colors, sequentially transferring images to an intermediate transfer belt from the image forming units of the respective colors, and further transferring the images collectively from the intermediate transfer belt to a recording material. Toner images developed on photosensitive drums of the image forming units of the respective colors are primarily transferred to the intermediate transfer belt. The toner images primarily transferred to the intermediate transfer belt are secondarily transferred to a transfer material at a transfer position.

In an image forming apparatus that uses an intermediate transfer belt, there is an issue that, if a gap occurs between a transfer material and the intermediate transfer belt at a position immediately anterior to a transfer portion, discharge can cause image defects due to the transfer of the toner image. For this reason, to prevent the occurrence of an image defect at a portion where electric discharge occurs, a countermeasure such as the prevention of abnormal electrical discharge at a gap between the intermediate transfer belt and the transfer material at the upstream of a transfer nip is required. In this case, if the transfer material is entered into the transfer nip which is a contact portion between the intermediate transfer belt and a secondary transfer member while bringing the transfer material into contact with the surface of the intermediate transfer belt on the upstream side in a conveyance direction of the transfer material of the transfer portion, it is possible to prevent abnormal electrical discharge from occurring at the transfer portion, and adequate transferability is obtained.

Japanese Patent Application Laid-Open No. 2009-204642 discusses preventing abnormal electrical discharge by supporting a transfer material from a print surface back side before secondary transfer, and ensuring an appropriate entrance angle by adjusting pressing force to be applied to the transfer material.

Nevertheless, the configuration discussed in Japanese Patent Application Laid-Open No. 2009-204642 has the following issues. In a case where a transfer material has high rigidity and has a property of being difficult to be brought into contact with an intermediate transfer belt, a transfer material is gloss paper with high resistance, or under a low-humidity environment where the transfer material is easily charged, abnormal electrical discharge at the transfer portion becomes prominent.

Thus, it is necessary to devise a way to bring the transfer material into contact with the intermediate transfer belt more effectively for general transfer materials in a normal temperature and pressure environment. The action of pressing the transfer material against the intermediate transfer belt requires a considerably complex mechanism and control, as well as additional space. This leads to an increase in the size of the image forming apparatus, a more complex configuration, and an increase in the number of components, resulting in higher manufacturing costs.

In an image forming apparatus that uses such an intermediate transfer belt, there is an issue that an abnormal electrical discharge occurs between a recording material and the intermediate transfer belt in an electric discharge region formed immediately anterior to a secondary transfer nip, and an image defect (void spots) where the toner image in the abnormal discharge area is not transferred and is missing.

As a method of controlling the image defect, Japanese Patent Application Laid-Open No. 2019-197114 discusses a configuration of weakening an electric field of an electric discharge region by bringing a grounded electrostatic charge removal portion into contact with a secondary transfer roller surface provided immediately anterior to a secondary transfer position, and decreasing the positional of the secondary transfer roller surface.

Nevertheless, the configuration discussed in Japanese Patent Application Laid-Open No. 2019-197114 has the following issue. In particular, under conditions prone to image defects, such as when the recording material is thick paper that has been left in a low-temperature, low-humidity environment and has dried out, requiring a high transfer voltage, or when a full-page high-density print pattern where toner defects are more noticeable is transferred, it has been difficult to balance image defect prevention and sheet conveyance performance.

In order to prevent image defects even under conditions prone to image defects, by arranging an electrostatic charge removal portion at a position closer to a secondary transfer nip, it is possible to obtain a configuration in which the electrostatic charge removal portion and a recording material are located close to each other. As a result, a conveyance issue that the recording material is damaged due to contact between the recording material and a control electrode in a case where the recording material is non-elastic paper such as thin paper or curled paper has sometimes arisen. In contrast, if a conveyance guide is arranged at a position immediately anterior to a secondary transfer nip to improve the conveyance of the recording material, the electrostatic charge removal portion has no choice but to be arranged away from the secondary transfer due to space restrictions. Consequently, it has been sometimes unable to prevent image defects under conditions prone to image defects.

As discussed in Japanese Patent Application Laid-Open No. 2019-197114, a conveyance guide serving as a guide unit for stably guiding a recording material to a transfer nip is sometimes arranged anteriorly to a transfer nip. In a case where such a conveyance guide is not electrically grounded, a charge potential occurs due to friction with the recording material in a low-humidity environment, and the potential sometimes acts to hinder transfer efficiency. For this reason, in general, conveyance guide is configured to be grounded to release charged particles. Nevertheless, if the conveyance guide is directly grounded without passing through a resistor, when a toner image is transferred to a recording material that has absorbed moisture to have lowered resistance, a transfer current leaks to the conveyance guide through the recording material, and transfer voids accordingly occur in some cases. As a method of preventing the transfer voids, as discussed in Japanese Patent Application Laid-Open No. S59-34570, a configuration of preventing a transfer current from leaking, by grounding a conveyance guide via a high-resistance resistive element has been proposed.

Nevertheless, in particular, there is an issue that, if a conveyance guide and an electrostatic charge removal portion are grounded via different conductive paths, a configuration for the conductive paths and a configuration for electrically connecting the conductive paths, and the conveyance guide and a control electrode are required in a limited space anterior to transfer, leading to upsizing of an image forming apparatus.

SUMMARY

In view of the foregoing, the disclosure according to the present application is directed to providing an image forming apparatus that prevents an image defect attributed to electric discharge that occurs in a transfer portion.

According to an aspect of the present disclosure, an image forming apparatus includes an image bearing member, a rotatable transfer member configured to be brought into contact with a surface of the image bearing member to form a transfer nip portion, and transfer, to a transfer material, toner supplied to the surface of the image bearing member, at the transfer nip portion, an electrostatic charge removal member configured to remove electrostatic charge from a surface of the transfer member at a counter portion facing the surface of the transfer member at an upstream of the transfer nip portion in both a rotational direction of the transfer member and a moving direction of the transfer material, and a transfer voltage application unit configured to apply a transfer voltage to the transfer member, wherein the electrostatic charge removal member is arranged in such a manner as to remove electrostatic charge from the surface of the transfer member at the counter portion in a state in which the transfer voltage is applied to the transfer member.

According to another aspect of the present disclosure, an image forming apparatus includes an image bearing member, a rotatable transfer member configured to be brought into contact with a surface of the image bearing member to form a transfer nip portion, and transfer, to a recording material, toner supplied to the surface of the image bearing member, at the transfer nip portion, a conveyance guide configured to guide the recording material to be conveyed to the transfer nip portion, the conveyance guide including a guide portion configured to guide conveyance of the recording material to the transfer nip portion by being brought into contact with a surface opposite to a surface of the recording material to which toner is to be transferred, an electrostatic charge removal portion configured to remove electrostatic charge from a surface of the transfer member at a counter portion facing the surface of the transfer member at an upstream of the transfer nip portion in both a rotational direction of the transfer member and a moving direction of the recording material, and a transfer voltage application unit configured to apply a transfer voltage to the transfer member, wherein the electrostatic charge removal portion removes electrostatic charge from the surface of the transfer member at the counter portion in a state in which the transfer voltage is applied to the transfer member.

According to yet another aspect of the present disclosure, an image forming apparatus includes an image bearing member, a rotatable transfer member configured to be brought into contact with a surface of the image bearing member to form a transfer nip portion, and transfer, to a recording material, toner supplied to the surface of the image bearing member, at the transfer nip portion, an electrostatic charge removal member configured to remove electrostatic charge from a surface of the transfer member at a counter portion facing the surface of the transfer member at an upstream of the transfer nip portion in both a rotational direction of the transfer member and a moving direction of the recording material, and a guide member configured to guide conveyance of the recording material to the transfer nip portion by being brought into contact with a surface opposite to a surface of the recording material to which toner is to be transferred, and a transfer voltage application unit configured to apply a transfer voltage to the transfer member, wherein the guide member and the electrostatic charge removal member are grounded via a same current suppression circuit, and wherein the electrostatic charge removal member removes electrostatic charge from the surface of the transfer member at the counter portion in a state in which the transfer voltage is applied to the transfer member.

Further features of the present disclosure will become apparent from the following description of exemplary embodiments with reference to the attached drawings.

DESCRIPTION OF THE EMBODIMENTS

Hereinafter, embodiments of the present disclosure will be described in detail with reference to the accompanying drawings. Here, the dimensions, materials, shapes, and relative arrangement of components described in the embodiments are to be appropriately changed depending on the configuration and various conditions of an apparatus to which the disclosure is applied, and are not intended to limit the scope of the disclosure to the following embodiments. Each of the embodiments of the present disclosure described below can be implemented solely or as a combination of a plurality of the embodiments or features thereof where necessary or where the combination of elements or features from individual embodiments in a single embodiment is beneficial.

[Image Forming Apparatus]

Figure 1:
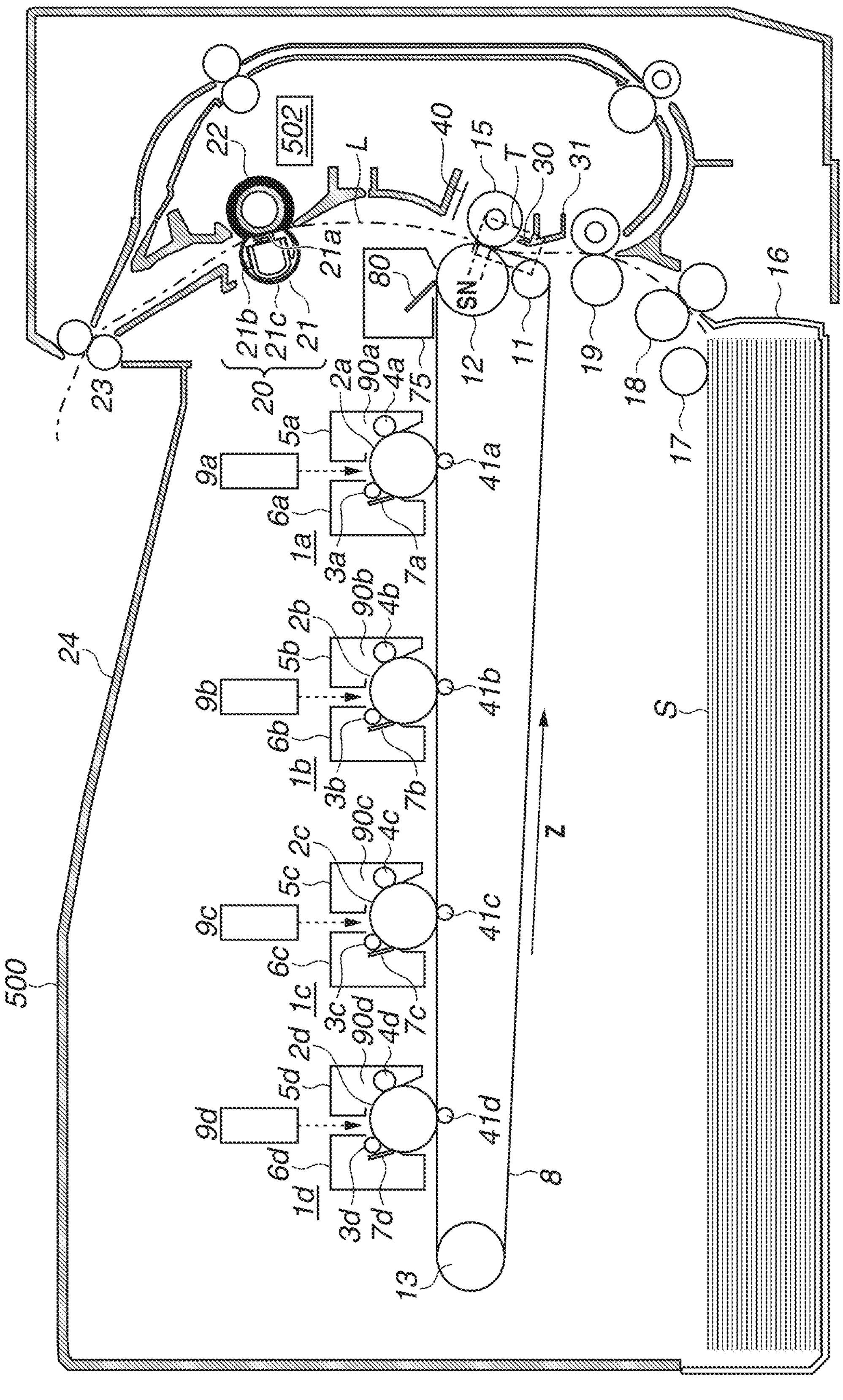
FIG. 1 is a diagram illustrating an image forming apparatus according to a first embodiment.

An image forming apparatus 500 according to the present embodiment that is illustrated in FIG. 1 is a tandem-type full-color image forming apparatus including an intermediate transfer member serving as an image bearing member, and FIG. 1 is a cross-sectional diagram illustrating a schematic configuration thereof.

In the image forming apparatus 500 according to the first embodiment, four image forming units (image forming units 1*a*, 1*b*, 1*c*, and 1*d* that form toner images of the colors including yellow (Y), magenta (M), cyan (C), and black (Bk)), respectively, are arranged from the upstream to the downstream. These four image forming units are arranged in a line (arranged side by side) at fixed intervals. The four image forming units include the image forming unit 1*a* that forms yellow images, the image forming unit 1*b* that forms magenta images, the image forming unit 1*c* that forms cyan images, and the image forming unit 1*d* that forms black images. In a state in which the image forming apparatus 500 is installed, an intermediate transfer belt 8 which is an intermediate transfer member stretched around rollers 11, 12, and 13 are arranged below the image forming units 1*a*, 1*b*, 1*c*, and 1*d* in the gravitational force direction.

In the image forming units 1*a*, 1*b*, 1*c*, and 1*d*, photosensitive drums 2*a*, 2*b*, 2*c*, and 2*d* serving as image bearing members are respectively arranged. In the present embodiment, the photosensitive drums 2*a*, 2*b*, 2*c*, and 2*d* are negatively-charged organic photosensitive drums, include photosensitive layers on drum base members such as aluminum, and are rotationally driven at a predetermined processing speed by a drive unit 60 (FIG. 5) serving as a drive device. The processing speed in the present embodiment is set to 100 mm/sec.

Development devices 5*a*, 5*b*, 5*c*, and 5*d* respectively including charging rollers 3*a*, 3*b*, 3*c*, and 3*d* serving as charging members, and development rollers 4*a*, 4*b*, 4*c*, and 4*d* serving as development members and developer bearing members are arranged around the photosensitive drums 2*a*, 2*b*, 2*c*, and 2*d* serving as image bearing members. Toners 90*a*, 90*b*, 90*c*, and 90*d* respectively corresponding to yellow (Y), magenta (M), cyan (C), and black (Bk) are stored inside the development devices 5*a*, 5*b*, 5*c*, and 5*d*, respectively. As the toners 90*a*, 90*b*, 90*c*, and 90*d*, nonmagnetic single-component polymerized toner with charge amount from −20 to −50 μC/mg are used. The normal charge polarity of the toners 90*a*, 90*b*, 90*c*, and 90*d* is set to negative polarity which is minus. The image forming apparatus 500 employs a reversal development method. Furthermore, cleaning devices 6*a*, 6*b*, 6*c*, and 6*d* including cleaning blades 7*a*, 7*b*, 7*c*, and 7*d* serving as cleaning members are respectively installed around the photosensitive drums 2*a*, 2*b*, 2*c*, and 2*d*. Foreign substances such as toner, paper dust, and loading material that remain on the surfaces of the photosensitive drums 2*a*, 2*b*, 2*c*, and 2*d* are scraped off by the cleaning blades 7*a*, 7*b*, 7*c*, and 7*d*, and stored in the cleaning devices 6*a*, 6*b*, 6*c*, and 6*d*. Furthermore, exposure devices 9*a*, 9*b*, 9*c*, and 9*d* are respectively installed above the photosensitive drums 2*a*, 2*b*, 2*c*, and 2*d* in the gravitational force direction.

Here, the configurations and the operations of the image forming units 1 are substantially the same except that the color of toner to be used varies. Accordingly, in the following description in a case where a specific distinction is not required, the image forming units 1 will be collectively described without using alphabetical letters a, b, c, and d added to the reference numerals in FIG. 1 to indicate the colors of the components. In the present embodiment, the four image forming units 1 will be described, but the number of image forming units 1 is not limited to this, and it is sufficient that a plurality of image forming units 1 is provided. A monochrome printer including a single image forming unit 1, which will be described, is also applicable.

The rotatable endless intermediate transfer belt 8 is installed as an intermediate transfer member at a position that the image forming units 1*a*, 1*b*, 1*c*, and 1*d* face. Primary transfer rollers 41*a*, 41*b*, 41*c*, and 41*d* for transferring toner images formed on the surfaces of the photosensitive drums 2*a*, 2*b*, 2*c*, and 2*d* are arranged on the surface of the intermediate transfer belt 8. The intermediate transfer belt 8 is stretched by a secondary transfer counter roller 12 and a tension roller 13 serving as a stretching member and also playing a role of driving of the intermediate transfer belt 8. Being driven by the secondary transfer counter roller 12 to which the drive unit 60 serving as a motor is connected, the intermediate transfer belt 8 is rotated (moved) in an arrow Z direction illustrated in FIG. 1 (counterclockwise direction in FIG. 1). As illustrated in FIG. 1, the four image forming units 1 and the four primary transfer rollers 41 are arranged side by side along the rotational direction of the intermediate transfer belt 8. Hereinafter, the rotational direction of the intermediate transfer belt 8 will be referred to as a circumferential direction of the intermediate transfer belt 8. The thickness of the intermediate transfer belt 8 is desirably in the range from 50 μm to 200 μm because a too-thin thickness weakens belt strength and too-thick thickness leads to lack of elasticity and bendability. The thickness affects the capacitance of the intermediate transfer belt 8. If the intermediate transfer belt 8 is too thin, the capacitance becomes large, and the intermediate transfer belt 8 is easily charged. In the present embodiment, the thickness of the intermediate transfer belt 8 is set to 80 μm in view of the foregoing. As the material of the intermediate transfer belt 8, polyimide (PI), polyethylene terephthalate (PET), polyethylene naphthalate (PEN), or polyvinylidene fluoride (PVDF) is generally used, and PI is used from the viewpoint of strength. The resistance of the intermediate transfer belt 8 is to be adjusted by adding a conductive agent in such a manner that a predetermined electric resistance is obtained. In the present embodiment, carbon black is used as the conductive agent. In general, the conductive mechanism of carbon black is electron conductive, and although the environmental dependence is small, the voltage dependence is large. In contrast, an ionic conductor has small voltage dependence and large environmental dependence. In the present embodiment, a configuration of preventing abnormal electrical discharge during secondary transfer by preventing or reducing a resistance value increase of the intermediate transfer belt 8 in a low-humidity environment, and decreasing a secondary transfer voltage suitable for secondary transfer is employed. The carbon black is desirable because the electric resistance can be adjusted by small-amount addition and a manufacturing cost is low. A volume resistivity in the present embodiment is set to the range from $10^8$ to $10^{14}$ Ω*cm. In a case where the volume resistivity is smaller than $10^8$ Ω*cm, the charge of toner transferred onto the intermediate transfer belt 8 flows out to the intermediate transfer belt 8, and a toner image is easily disturbed. In contrast, if the volume resistivity exceeds $10^{14}$ Ω*cm, a voltage to be applied for secondary transfer becomes larger, and abnormal electrical discharge easily occurs.

The drive unit 60 may include a drive unit for the secondary transfer counter roller 12 separately from a drive unit for the photosensitive drums 2.

Figure 5:
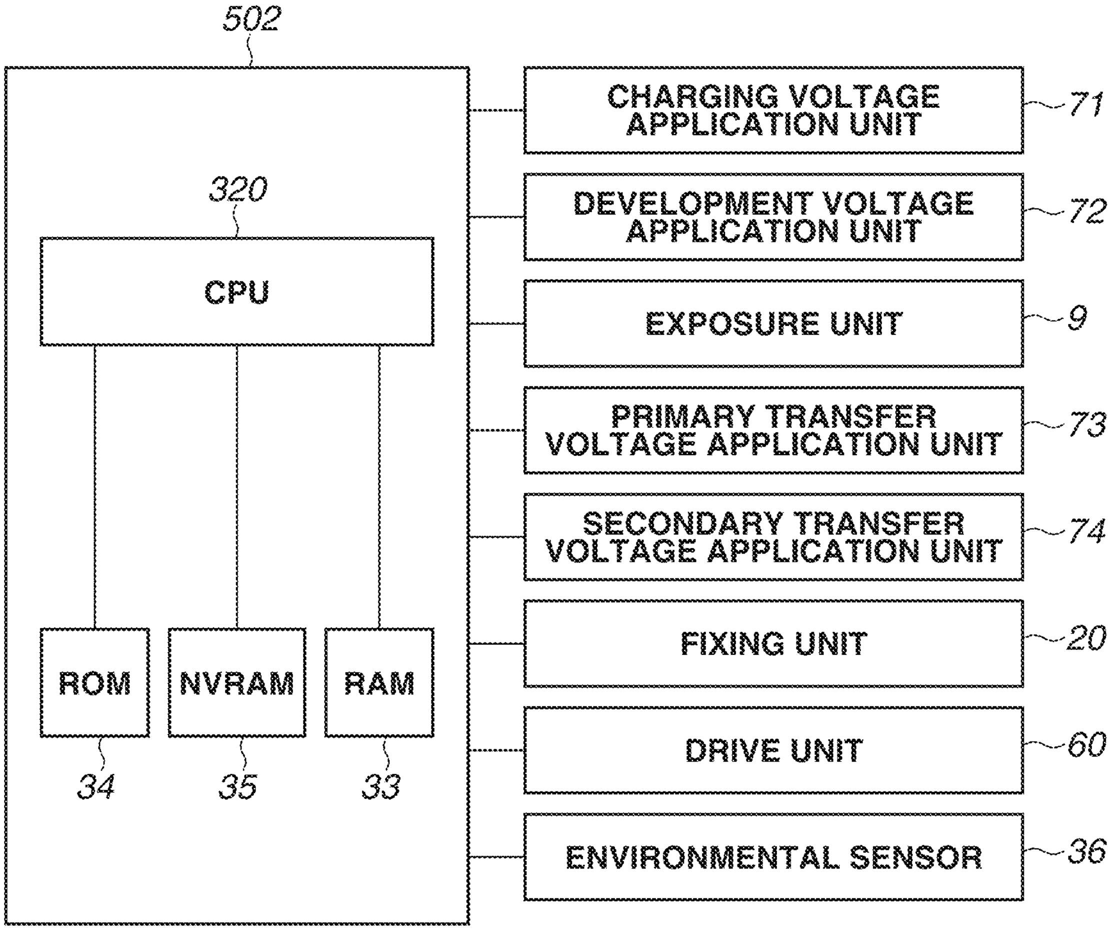
FIG. 5 is a control block diagram according to the first embodiment.

A transfer voltage (bias) with positive polarity, which is opposite polarity to the normal polarity of the toner 90 that has been subjected to constant voltage control or constant current control, is applied to a primary transfer roller 41 from a primary transfer power source 73 serving as a primary transfer voltage application unit that is illustrated in FIG. 5. The toner image formed on the photosensitive drum 2 is transferred onto the intermediate transfer belt 8.

A secondary transfer roller 15 serving as a secondary transfer member transfers the toner image formed on the intermediate transfer belt 8, to a transfer material S serving as a recording material. In the present embodiment, the secondary transfer roller 15 having the outer diameter of 18 mm is obtained by covering a metal core having the outer diameter of 8 mm with a foam sponge member made of nitrile rubber (NBR). A voltage with positive polarity that has been subjected to constant voltage control or constant current control is applied to the secondary transfer roller 15 from a secondary transfer power source 74 serving as a secondary transfer voltage application unit that is illustrated in FIG. 5.

A high frictional rubber layer is provided on the secondary transfer counter roller 12 to drive the intermediate transfer belt 8, and the rubber layer has conductivity with a volume resistivity of $10^5$ Ω*cm or less.

The secondary transfer counter roller 12 forms a secondary transfer portion SN by being brought into contact with the secondary transfer roller 15 serving as a secondary transfer member, via the intermediate transfer belt 8. Here, the secondary transfer roller 15 is arranged in contact with the intermediate transfer belt 8, and forms a secondary transfer nip SN (hereinafter, may be referred to as transfer nip portion SN) with the intermediate transfer belt 8 as illustrated in FIG. 1. The tension roller 13 applies tensile force with total pressing force of about 60 N to the intermediate transfer belt 8, and rotates by being driven by the intermediate transfer belt 8.

An assist roller 11 regulates the angle of the intermediate transfer belt 8 with respect to a conveyance path (dotted line L in FIG. 1) of the transfer material S in such a manner that the transfer material S enters the secondary transfer nip SN while being in contact with the intermediate transfer belt 8.

The assist roller 11, the secondary transfer counter roller 12 (counter member), and the tension roller 13 are grounded via resistive elements with the same resistance value. In the present embodiment, three types of resistance values of the resistive elements including 1 GΩ, 100 MΩ, and 10 MΩ are used. The resistances of rubber layers of the assist roller 11 and the secondary transfer counter roller 12 are small enough as compared with 1 GΩ, 100 MΩ, and 10 MΩ, so that the electrical effect is ignorable.

As the secondary transfer roller 15, an elastic roller with a volume resistivity of $10^7$ to $10^9$ Ωcm and a rubber hardness of 30° (ASKER Durometer Type C) is used. In addition, the secondary transfer roller 15 is configured to press the secondary transfer counter roller 12 via the intermediate transfer belt 8 with a total pressing force of about 39.2 N. The secondary transfer roller 15 also rotates by being driven by the rotation of the intermediate transfer belt 8.

Furthermore, a secondary transfer voltage of −2.0 to 7.0 kV can be applied to the secondary transfer roller 15 from the secondary transfer voltage application unit 74 serving as a secondary transfer (high-voltage) power source that is illustrated in FIG. 5. The secondary transfer roller 15 corresponds to a transfer member, and the secondary transfer roller 15 and the secondary transfer power source 74 correspond to a secondary transfer unit. A belt cleaning device 75 including a belt cleaning blade 80 serving as a belt cleaning member that removes and collects transfer residual toner remaining on the surface of the intermediate transfer belt 8 is installed on the outside (outer circumferential side) of the intermediate transfer belt 8.

Figure 2:
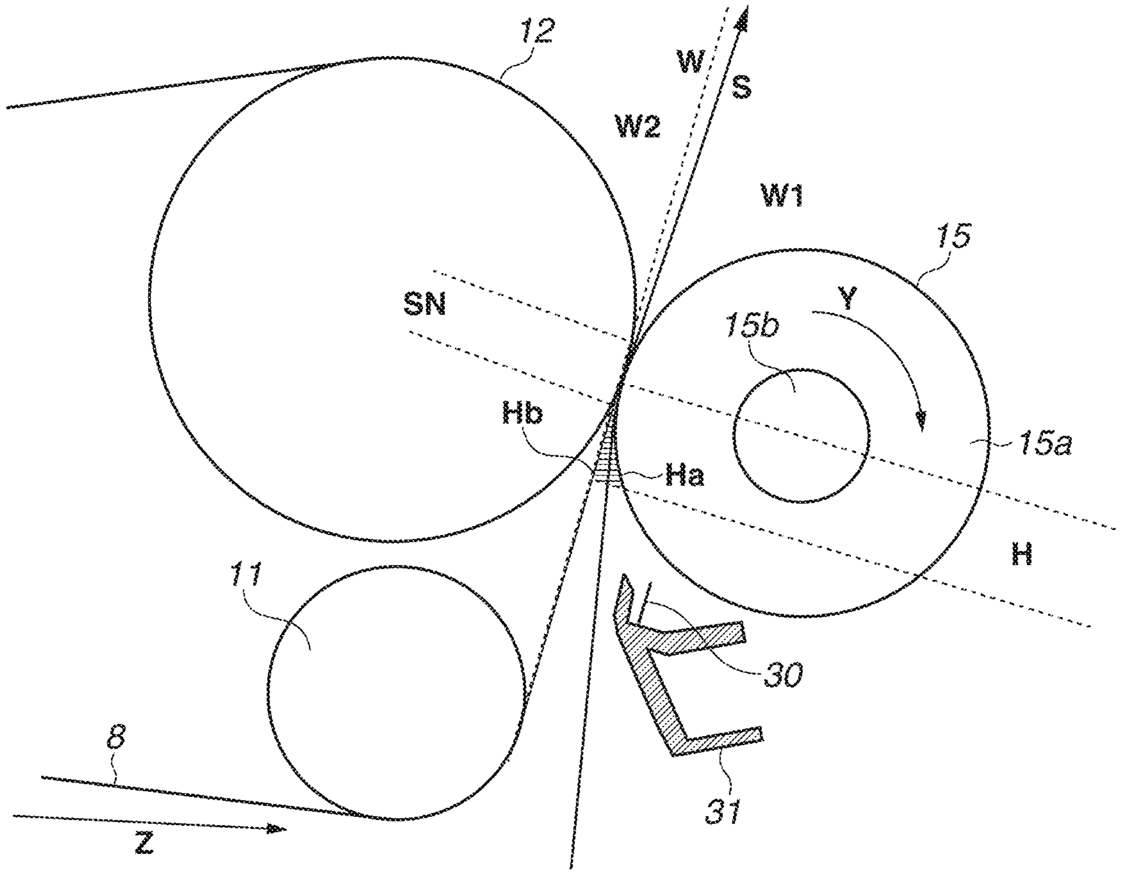
FIG. 2 is an enlarged view of a secondary transfer portion according to the first embodiment.

As illustrated in FIG. 2, the secondary transfer roller 15 includes a metal core **15*b* with a circular cylindrical shape, and a cylindrically-shaped elastic layer 15*a* covering the outer circumferential surface of the metal core 15*b*. The outer diameter of the metal core 15*b* is set to 6 mm and the outer diameter of the elastic layer 15*a* is set to 16 mm. A conductive material with high rigidity is used as the metal core 15*b*, and iron is used in the present embodiment. As the elastic layer 15*a*, a layer obtained by foaming generally-used acrylonitrile-butadiene rubber (NBR)-based ion conductive rubber in a sponge-like manner is used. The volume resistivity of the elastic layer 15*a*** of the present embodiment is set to $10^7$ to $10^9$ Ω*cm. If the volume resistivity of the secondary transfer roller 15 is too low, the resistance value of the transfer material S exerts larger influence on transferability, which can make the transferability unstable depending on the environment. In contrast, if the volume resistivity is too high, a voltage to be applied for secondary transfer becomes larger, and abnormal electrical discharge easily occurs. For this reason, the volume resistivity of the elastic layer **15*a*** is desirably in the range from $10^5$ to $10^{11}$ Ω*cm. The width of the transfer nip portion SN becomes wider if the hardness of the secondary transfer roller 15 is too soft, so that excessively weak hardness causes an increase in the torque of the secondary transfer roller 15 being driven to rotate. The secondary transfer roller 15 with excessively high hardness decreases the nip width of the transfer nip portion SN, which may result in a transfer defect, so that the hardness of the secondary transfer roller 15 is desirably in the range from 20° to 40° with 500-g load, which is measured by ASKER Durometer Type C. The secondary transfer roller 15 with the hardness of 30° with 500-g load by the ASKER Durometer Type C is used.

The dotted line L in FIG. 1 is a conveyance line indicating a conveyance path on which the transfer material S is conveyed when an image is formed on a first surface (front surface) of the transfer material S. A sheet feeding unit feeds and conveys the transfer material S to a secondary transfer portion T, and a plurality of transfer materials S is stored in a sheet feeding cassette 16. In forming an image, the uppermost transfer material S placed in the sheet feeding cassette 16 is picked up by a pickup roller 17 (semilunar roller), and a sheet feeding roller pair 18 conveys the transfer material S to a registration roller pair 19 serving as a conveyance roller. The leading end of the transfer material S is brought into contact with the registration roller pair 19 to stop. A toner image formed by the image forming unit 1 is transferred to the intermediate transfer belt 8, and the transfer material S is conveyed by the registration roller pair 19 to the secondary transfer portion T in synchronization with a timing at which the leading end of the toner image on the intermediate transfer belt 8 moves to the secondary transfer portion T. The toner image on the intermediate transfer belt 8 is transferred to the transfer material S.

A downstream electrostatic charge eliminator 40 for removing electrostatic charge formed on the transfer material S is arranged downstream in the conveyance direction of the transfer material S. The downstream electrostatic charge eliminator 40 is obtained by processing a thin plate material made of SUS304 stainless steel (Japanese JIS standard grade) with a thickness of 0.1 mm, into a serrated shape, and a pitch of adjacent serrations is set to 1 mm. The downstream electrostatic charge eliminator 40 is installed at a height where the downstream electrostatic charge eliminator 40 does not come into contact with the conveyed transfer material S, in such a manner that the leading ends of the serrations face a second surface (rear surface) of the transfer material S. Removing electrostatic charge from the transfer material S on the downstream in the conveyance direction of the transfer material S having passed through the secondary transfer portion T decreases the electrostatic adsorption force on the intermediate transfer belt 8, thus enhancing the separability of the transfer material S. In the present embodiment, the distance between the leading end of the downstream electrostatic charge eliminator 40 and the secondary transfer roller 15 is set to 3 mm.

A fixing member 20 (may be referred to as a fixing device 20 and a fixing unit 20) serving as a fixing unit fixes a multi-colored toner image transferred onto the transfer material S. A heating member 21 disposed to face a print surface of the transfer material S includes a ceramic heater 21*a* (hereinafter, described as a heater) which is a plate-like heat generator made of a ceramic material, a holder member 21*b* for holding the heater 21*a*, and a fixing film 21*c* of the heating member 21 that surrounds the entire perimeters of the heater 21*a* and the holder member 21*b*. A thermistor for temperature control that controls the temperature of the heater 21*a* is disposed on the back side of the heater 21*a*.

The fixing member 20 forms a fixing nip by being pressed by a pressure roller 22 from the opposite side to it. Thus, the fixing member 20 heats the print surface of the transfer material S using the heating member 21 and presses the non-print surface thereof using the pressure roller 22, thus melting the toner image and fixing the toner image to the transfer material S. A discharge roller pair 23 is provided downstream of the fixing member 20 in the conveyance direction of the transfer material S, and discharges the transfer material S to a discharge tray 24 of the image forming apparatus 500.

[Control Unit]

A control unit 502 in FIG. 1 included in the image forming apparatus 500 controls the operations of the image forming units 1. FIG. 5 is a block diagram illustrating a control configuration of a main part of the image forming apparatus 500 of the present embodiment. The control unit 502 will be described in more detail with reference to FIG. 5.

The control unit 502 includes a central processing unit (CPU) 320 serving as an arithmetic processing unit which is a central element that performs various types of arithmetic processing, and an internal memory that is a memory element serving as a storage unit storing information, such as a random access memory (RAM) 33, a read-only memory (ROM) 34, and a nonvolatile random access memory (NVRAM) 35. In addition to the exposure device 9, the RAM 33, the ROM 34, and the NVRAM 35, which is a nonvolatile memory, are connected to the CPU 320. The ROM 34 is a read-only storage unit (memory), and programs and various types of data for the CPU 320 controlling the image forming apparatus 500 are written into the ROM 34. The RAM 33 is a readable and writable memory, and data in the ROM 34 is loaded onto the RAM 33 or various types of data are stored into the RAM. The NVRAM 35 is a readable and writable memory in which recorded data is held even if the power of the image forming apparatus is shut off. Sensor detection results, counter count results, and calculation results are temporarily stored in the RAM 33. Control programs and data tables preliminarily obtained through experiments are stored in the ROM 34. Counter count results, various types of setting information, and sensor results are stored in the NVRAM 35.

An environmental sensor 36 includes a temperature sensor and a relative humidity sensor, temperature information in an engine unit and relative humidity information are retrieved by the CPU 320, and used for the control of the image forming unit 1.

Via electric connection, signals indicating various types of information are input to the control unit 502 or output from the control unit 502. The control unit 502 performs the processing of signals input from various process devices and a sensor, and the processing of signals to be output to issue operation commands to the various process devices.

The components to be controlled in the image forming apparatus 500, a sensor, and a counter are connected to the control unit 502. The control unit 502 controls a predetermined image formation sequence by controlling input-output of various signals and a drive timing of each component.

For example, the control unit 502 controls a charging power source 71 serving as a charging voltage application unit for applying a charging voltage to a charging roller 3, and a development power source 72 serving as a development voltage application unit for applying a development voltage to a development roller 4. Moreover, the control unit 502 controls the exposure device 9, the primary transfer power source 73 serving as a primary transfer voltage application unit, the secondary transfer power source 74 serving as a secondary transfer voltage application unit, the fixing unit 20, and the drive unit 60.

The drive unit 60 includes a drive motor serving as a drive source, and a drive transmission member. Drive sources that drive rotatable members such as the photosensitive drums 2 and the development rollers 4 may be individually provided, or a common drive source may be shared by at least part of these. Drive sources that drive components of the respective colors may be individually provided, or a common drive source may be shared by at least part of the components.

Here, the image forming apparatus 500 executes an image formation operation (print job) including a series of operations of forming an image(s) on a single or a plurality of transfer materials S and outputting the transfer materials S that is to be started in response to one start instruction. The image formation operation generally includes an image formation process, a pre-process (pre-rotation process, pre-printing operation), a paper-interval process to be executed in the case of forming images on a plurality of transfer materials S, and a post-process (post-rotation process, post-printing operation). The image formation process is a period during which the formation of an electrostatic latent image of an image to be actually formed on the transfer material S and output, the formation of a toner image, and the primary transfer and fixing of the toner image are performed, and an image formation time refers to this period. More specifically, the timing of the image formation time varies among positions where a charging process, an exposure process, a development process, a primary transfer process, a secondary transfer process, and a fixing process are performed. The pre-process, which is a pre-rotation operation, corresponds to a period during which a preparation operation prior to an image formation process is performed, and corresponds to a period from an input of a start instruction to the start of the actual formation of an image. The paper-interval process which is a paper-interval operation corresponds to the period between successive image formations on a plurality of transfer materials S in continuous image formation on transfer materials S (consecutive image formation). The post-rotation process, which is a post-rotation operation, corresponds to a period during which an organization operation (preparation operation) subsequent to the image formation process is performed. A non-image formation time corresponds to a period other than the image formation time, and includes the above-described pre-process, and the paper-interval process, the post-process, and further includes a multiple pre-rotation process which is a preparation operation to be performed at the time of power input of the image forming apparatus 500 or return from a sleep state.

[Image Formation Operation]

In the image formation operation, if image formation starts, the photosensitive drum 2 and the intermediate transfer belt 8 start to rotate in the arrow Z direction by being driven by the drive unit 60 at a predetermined process speed (100 mm/sec in this example). Electric discharge occurs between the photosensitive drum 2 and the charging roller 3 to which a predetermined charging voltage (about −1000 V) is applied by the charging power source 71, and the photosensitive drum 2 is uniformly charged to a surface potential of about −450 V. The surface potential of about −450 V applied at the time will be referred to as a dark portion potential Vd. Subsequently, an electrostatic latent image that is based on image data for output is formed by scanning beams from the exposure device 9. The surface potential of the photosensitive drum 2 that is applied when an electrostatic latent image of a solid image is formed is about −100 V. The surface potential of about −100 V applied at the time will be referred to as a bright portion potential Vl.

The electrostatic latent images of the respective colors that are formed at the time are formed at predetermined timings for the respective colors in such a manner that images of the four colors are overlaid later on the intermediate transfer belt 8 to become a full-color image. If the exposed photosensitive drums 2 further rotate, the electrostatic latent images on the photosensitive drums 2 are visualized (developed) by the development rollers 4 to which a development voltage of about −300 V is applied by the development power source 72. The development roller 4 rotates in a forward direction with respect to the rotational direction of the photosensitive drum 2. The Y, M, C, and Bk toner images are each formed on the photosensitive drums 2. If the toner images on the photosensitive drums 2 further rotate, the toner images are transferred onto the intermediate transfer belt 8 by the corresponding primary transfer rollers 41 to which a primary transfer voltage of about +800 V is applied by the primary transfer power source 73.

The transfer materials S stacked on the sheet feeding cassette 16 are fed by a sheet feeding roller 17 also serving as a semilunar pickup roller, and separated into one by the sheet feeding roller pair 18 also serving as a separation roller, conveyed up to the registration roller pair 19, and stopped. The temporarily stopped transfer material S is supplied by the registration roller pair 19 to the secondary transfer nip SN in synchronization with a timing at which the four-color toner image formed on the intermediate transfer belt 8 reaches the secondary transfer nip SN. The secondary transfer voltage is then applied by the secondary transfer power source 74, and the toner image on the intermediate transfer belt 8 is transferred onto the transfer material S.

The transfer material S bearing the transferred toner image is separated from the intermediate transfer belt 8 and fed to the fixing device 20. In the fixing device 20, the print surface of the transfer material S is heated by the heating member 21 and the non-print surface thereof is pressed by the pressure roller 22, so that the toner image is melted and fixed to the transfer material S. The discharge roller pair 23 is provided downstream of the fixing member 20 in the conveyance direction of the transfer material S, and discharges the transfer material S to the discharge tray 24 of the image forming apparatus 500. Transfer residual toner remaining on the surface of the intermediate transfer belt 8 is collected by the belt cleaning device 75 including the belt cleaning blade 80 serving as a belt cleaning member.

[Pre-Transfer Electrostatic Charge Removal Member]

In the configuration of the present embodiment, a pre-transfer electrostatic charge eliminator 30 (may be referred to as a pre-transfer electrostatic charge removal member 30) is arranged upstream of both the secondary transfer nip portion SN in the conveyance direction of the transfer material S and the secondary transfer roller 15 in the rotational direction, as an electrostatic charge removal unit for removing electrostatic charge from the surface of the secondary transfer roller 15. The pre-transfer electrostatic charge removal member 30 of the present embodiment is an electrostatic charge eliminator. The pre-transfer electrostatic charge eliminator 30 is arranged upstream of the secondary transfer roller 15 in the rotational direction, and a leading end 30*a* of the electrostatic charge eliminator is directed to a surface of the secondary transfer roller 15 in the proximity of the upstream of the secondary transfer nip portion SN. In other words, the leading end 30*a* of the electrostatic charge eliminator faces the secondary transfer roller 15 in the proximity of the upstream of the secondary transfer nip portion SN. When a transfer voltage applied to the secondary transfer roller 15 reaches a certain predetermined transfer voltage, an ion current is generated due to a potential difference between the leading end 30*a* of the pre-transfer electrostatic charge eliminator 30 and the surface of the secondary transfer roller 15 at a shortest distance from the leading end 30*a*. This removes electrostatic charge from the surface of the secondary transfer roller 15 near the upstream of the secondary transfer nip portion SN. Thus, an electric field generated upstream of the secondary transfer nip portion SN accordingly becomes smaller, and even if a transfer voltage that has conventionally caused an image defect due to an electric discharge phenomenon is applied to the secondary transfer roller 15, an electric discharge phenomenon upstream of the secondary transfer nip portion SN is prevented, and adequate image quality is obtained. Hereinafter, the pre-transfer electrostatic charge eliminator 30 will be described in detail with reference to FIG. 6.

Figure 6:
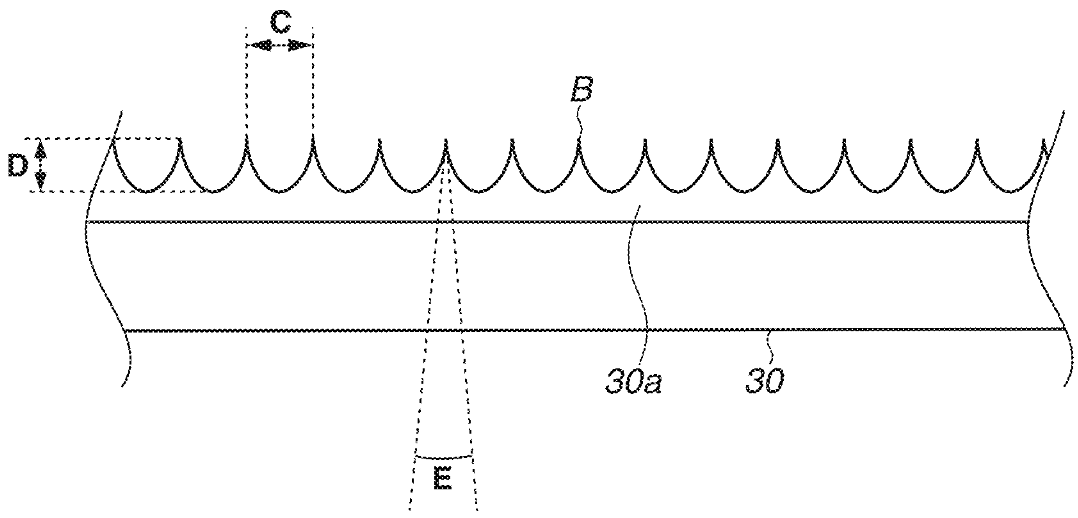
FIG. 6 is a configuration diagram of a pre-transfer electrostatic charge eliminator according to the first embodiment.

As illustrated in FIG. 6, the pre-transfer electrostatic charge eliminator 30 is an electrostatic charge eliminator obtained by processing a thin plate material leading end made of SUS304 stainless steel with a thickness of 0.1 mm, into a serrated shape, and a pitch C of adjacent serrations is set to 3.5 mm, a length D of each serration is set to 2 mm, and a leading end angle E of each serration is set to 18.9°. The pitch C of each serration is desirably in the range from about 0.5 mm to 8.0 mm because, if the pitch C of each serration is too wide, areas where electrostatic charge is not removed will occur, and if it is too narrow, the effect of leading end electric discharge will be diminished. The pre-transfer electrostatic charge eliminator 30 is arranged at a height where the pre-transfer electrostatic charge eliminator 30 has no contact with the conveyed transfer material S, in such a manner that the leading end 30*a* of the respective serrations faces the surface of the secondary transfer roller 15 in the proximity of the secondary transfer nip SN. The pre-transfer electrostatic charge eliminator 30 is supported by a support member 31 and grounded via a circuit (not illustrated). The leading end 30*a* of the respective serrations of the pre-transfer electrostatic charge eliminator 30 is arranged at a position not in contact with the secondary transfer roller 15. In other words, the leading end 30*a* of the pre-transfer electrostatic charge eliminator 30 is arranged at a position facing the surface of the secondary transfer roller 15, and forms a counter portion.

Figure 7:
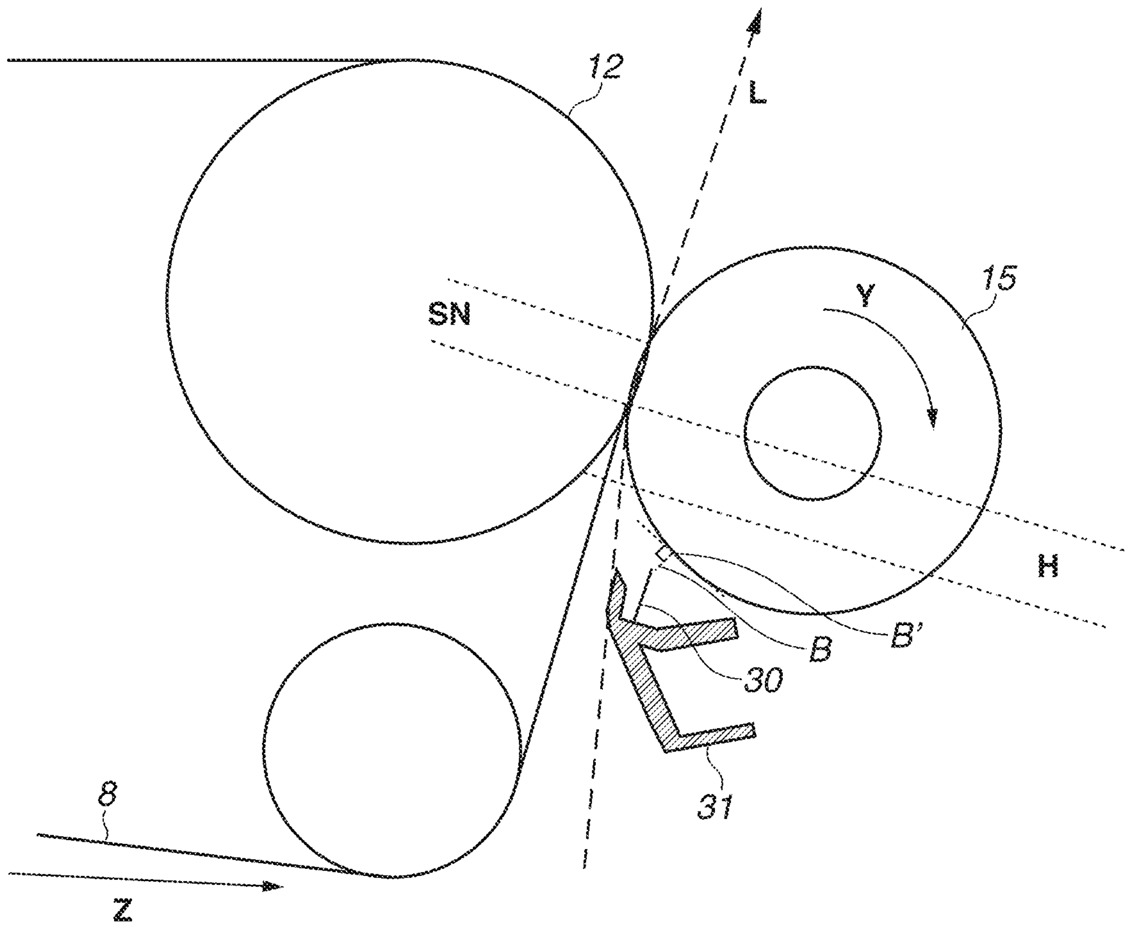
FIG. 7 is a diagram illustrating a positional relationship between a pre-transfer electrostatic charge eliminator and a secondary transfer roller according to the first embodiment.

The leading end 30*a* of the pre-transfer electrostatic charge eliminator 30 is arranged in such a manner as to be oriented toward the direction of the secondary transfer roller 15 in a state where the leading end 30*a* is out of contact with the secondary transfer roller 15 across a clearance gap of 3 mm. With this configuration, when a secondary transfer voltage is applied, ion current concentrates on the leading end 30*a* of the pre-transfer electrostatic charge eliminator 30. For this reason, corona discharge occurs between the pre-transfer electrostatic charge eliminator 30 and an electrostatic charge removal position B', and potential of the surface of the secondary transfer roller 15 decreases, thus preventing an image defect. An electrostatic charge removal position B' is a position on the surface of the secondary transfer roller 15 and is closest to the pre-transfer electrostatic charge eliminator 30. As illustrated in FIG. 7, a straight line B-B' is perpendicular to the tangent of the surface of the secondary transfer roller 15. The distance of the straight line B-B' is defined as the distance between the secondary transfer roller 15 and the leading end 30*a* of the pre-transfer electrostatic charge eliminator 30.

The greater the amount of current generated by the corona discharge, the lower the potential at the electrostatic charge removal position B', and the greater the discharge reduction effect. Thus, the distance between the pre-transfer electrostatic charge eliminator 30 and the electrostatic charge removal position B' is to be set closer than the corona discharge initiation distance between the pre-transfer electrostatic charge eliminator 30 and the electrostatic charge removal position B'. To obtain a sufficient image defect prevention effect, an amount of current flowing between the pre-transfer electrostatic charge eliminator 30 and the electrostatic charge removal position B' due to the corona discharge is desirably equal to or larger than a transfer current flowing through the transfer nip SN. The distance between the secondary transfer roller 15 and the leading end 30*a* of the pre-transfer electrostatic charge eliminator 30 is desirably 1 mm to 10 mm. The angle of the respective serrations relative to the secondary transfer roller 15 is most effective for removing electrostatic charge when the leading end of the serrations point towards the rotational center of the secondary transfer roller 15. Additionally, as the distance between the leading end of the serrations and the secondary transfer nip SN decreases, a higher effect can be expected. If the serration leading end is arranged in the proximity of the upstream of the secondary transfer nip SN in the conveyance direction of the transfer material S, the effect can be exhibited. It is therefore sufficient that the angle and the position are appropriately set depending on the configuration of the image forming apparatus 500.

A configuration in the proximity of the pre-transfer electrostatic charge eliminator 30 will be described in detail with reference to FIG. 2. FIG. 2 is an enlarged view illustrating the proximity of the secondary transfer portion T in FIG. 1 that is formed by the intermediate transfer belt 8 and the secondary transfer roller 15 when the transfer material S moves toward the secondary transfer portion T. The intermediate transfer belt 8 is stretched by the assist roller 11, the secondary transfer counter roller 12 also playing a role of driving of the intermediate transfer belt 8, and the tension roller 13 not illustrated in FIG. 2. The secondary transfer nip SN is formed by the secondary transfer counter roller 12 and the secondary transfer roller 15 that faces and presses against the secondary transfer counter roller 12 via the intermediate transfer belt 8. The intermediate transfer belt 8 moves on its surface in the arrow Z direction, and the secondary transfer roller 15 rotates in an arrow Y direction. By the transfer material S obtaining charge for secondary transfer, from the secondary transfer roller 15 at the transfer nip SN, toner on the intermediate transfer belt 8 is transferred to the transfer material S. Out of regions W1 and W2 defined by a tangent line W of the secondary transfer roller 15 and the intermediate transfer belt 8, the pre-transfer electrostatic charge eliminator 30 is arranged in the region W1 where the secondary transfer roller 15 is arranged.

In a gap immediately before the transfer material S enters the secondary transfer nip portion SN, which is a nip of the intermediate transfer belt 8 and the secondary transfer roller 15, an electric discharge region H is formed by the transfer voltage applied by the secondary transfer roller 15. When the transfer material S enters the electric discharge region H, an electric discharge region Ha is formed between the secondary transfer roller 15 and the transfer material S, and an electric discharge region Hb is formed between the transfer material S and the intermediate transfer belt 8. In a case where the volume resistance of the secondary transfer roller 15 has increased, for example, in low-temperature low-humidity environment or during the latter half of use of the image forming apparatus 500, to cause the transfer material S to obtain charge for secondary transfer, a transfer voltage to be applied to the secondary transfer roller 15 is to be increased. If a transfer voltage to be applied to the secondary transfer roller 15 increases, an electric field of the electric discharge region H becomes stronger, and if the transfer material S is conveyed in this state, the rear surface of the transfer material S is strongly charged in the electric discharge region Ha. In the electric discharge region Hb, abnormal electrical discharge occurs between the front surface of the transfer material S and the intermediate transfer belt 8, the potential of toner on the intermediate transfer belt 8 is disturbed, resulting in an image defect. In the present embodiment, to prevent the above-described image defect, the pre-transfer electrostatic charge eliminator 30 forms a counter portion B-B' upstream in the rotational direction of the secondary transfer roller 15 of the electric discharge region H where electric discharge occurs between the secondary transfer roller 15 and the intermediate transfer belt 8.

In view of the foregoing, in the present embodiment, the pre-transfer electrostatic charge eliminator 30 is arranged in such a manner that the leading end 30*a* of the respective serrations of the pre-transfer electrostatic charge eliminator 30 is oriented toward the surface of the secondary transfer roller 15 in the proximity of the secondary transfer nip SN, so that electrostatic charge is removed from the surface of the secondary transfer roller 15 before the surface of the secondary transfer roller 15 reaches the secondary transfer nip portion SN. If electrostatic charge is removed from the surface of the secondary transfer roller 15, an electric field of the electric discharge region H becomes smaller, and abnormal electrical discharge is prevented from occurring in the electric discharge region Hb, thus preventing image defects. The transfer voltage applied to the secondary transfer roller 15 ensures current to be applied for transfer. In the present embodiment, a charge eliminator not in contact with an electrostatic charge removal member is employed. Alternatively, a configuration in which an electrically-grounded metal plate is pressed against the transfer member can produce a similar effect, for example. Here, in a case where an electrostatic charge removal member is a non-contact electrostatic charge eliminator as in the configuration of the present embodiment, the pre-transfer electrostatic charge eliminator 30 exerts an electrostatic charge removal effect in a state in which a transfer voltage applied to the secondary transfer roller 15 is large to some extent. If the transfer voltage is small, a potential difference between the pre-transfer electrostatic charge eliminator 30 and the surface of the secondary transfer roller 15 also becomes small, and an electrostatic charge removal current does not flow. In other words, in an environment in which a transfer voltage used for secondary transfer is small and an image defect attributed to electric discharge at the upstream of the secondary transfer nip portion SN does not occur in the first place, such as a room-temperature environment or a high-temperature and high-humidity environment, causing an electrostatic charge removal current to flow is unnecessary. Accordingly, by changing a transfer condition depending on the environment, it is possible to reduce load of transfer high-voltage output and effectively exert an electrostatic charge removal effect under necessary conditions. In other words, in a case where a transfer voltage in an image formation operation reaches a level that causes electric discharge with the pre-transfer electrostatic charge eliminator 30, it is sufficient that a current flows to the pre-transfer electrostatic charge eliminator 30. Furthermore, under conditions where electric discharge occurs, electrostatic charge may be removed in a non-image formation operation. The non-image formation operation includes a pre-rotation operation to be executed before the image formation operation, a post-rotation operation to be executed after an image formation operation, and a paper-interval operation to be executed between image formation operations.

[Confirmation of Phenomenon by Experiment]

Subsequently, a result obtained by conducting an experiment for verifying an effect of the pre-transfer electrostatic charge eliminator 30 of the present embodiment is indicated. By the experiment, a phenomenon in which the pre-transfer electrostatic charge eliminator 30 removes the surface potential from the surface of the secondary transfer roller 15 was confirmed.

Figure 3:
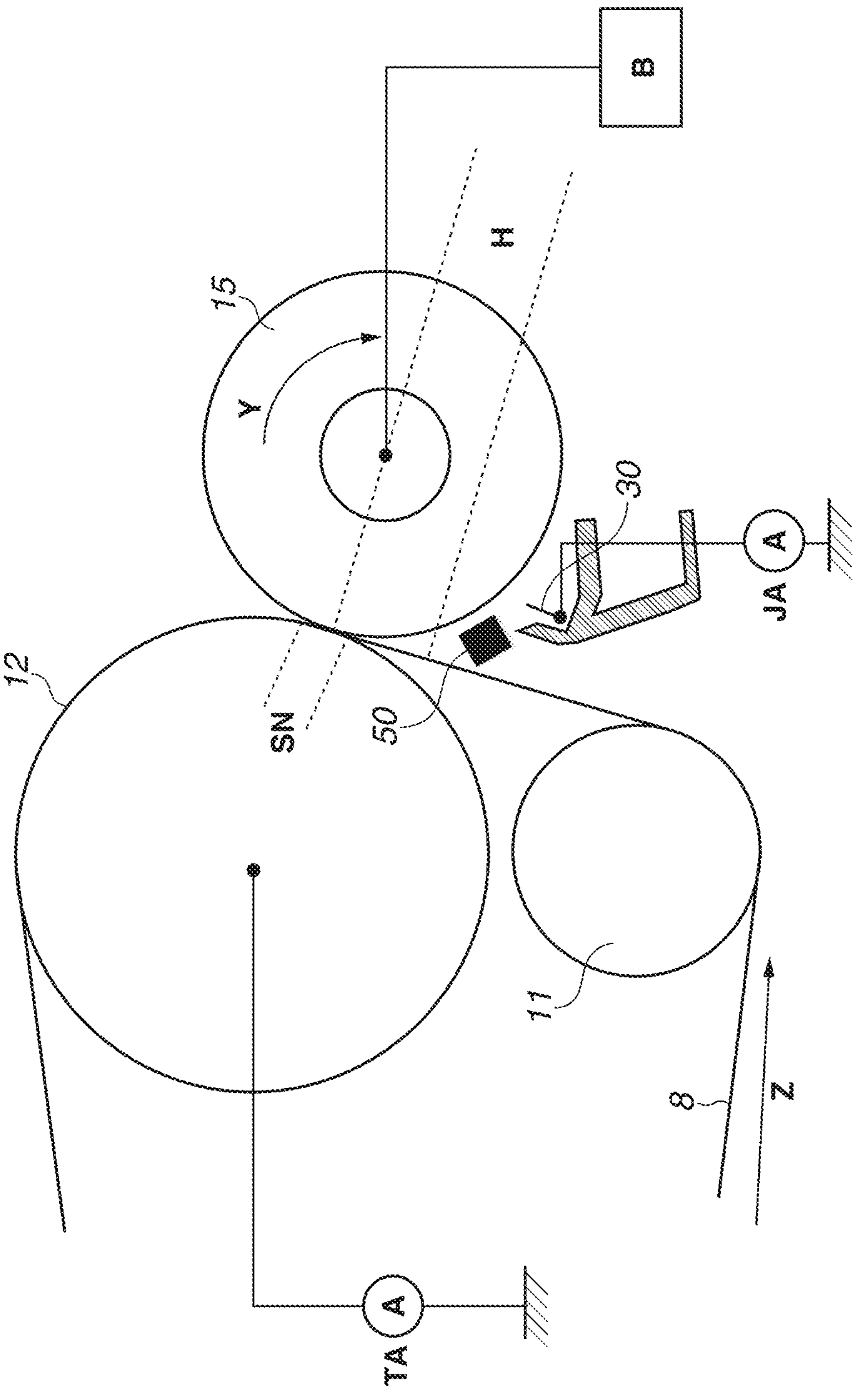
FIG. 3 is a diagram illustrating an experimental system for phenomenon check according to the first embodiment.

FIG. 3 is a diagram illustrating the proximity of the secondary transfer portion T formed by the intermediate transfer belt 8 and the secondary transfer roller 15 that were used in the experiment. A high-voltage power source K is arranged in such a manner as to be able to apply a transfer voltage to the secondary transfer roller 15 via the metal core 15*b* of the secondary transfer roller 15. In an environment with a room temperature of 15° C. and a humidity of 10%, a transfer voltage applied by the high-voltage power source K to the secondary transfer roller 15 was monitored, and a current (transfer current TAI) flowing to the ground from the secondary transfer roller 15 via the secondary transfer counter roller 12 was measured using an ammeter TA. A surface potential measurement probe 50 (surface potential meter MODEL 341B manufactured by Trek Japan) is arranged upstream of the secondary transfer nip portion SN, and the surface potential of the secondary transfer roller 15 upstream of the secondary transfer nip portion SN is measured. The pre-transfer electrostatic charge eliminator 30 is grounded via an ammeter JA, and a current (electrostatic charge removal current JAI) flowing to the pre-transfer electrostatic charge eliminator 30 is monitored using the ammeter JA. The transfer voltage applied to the secondary transfer roller 15 was varied, and the changes in the surface potential of the secondary transfer roller 15, as well as the values of the transfer current TAI and the electrostatic charge removal current JAI, were plotted with and without the pre-transfer electrostatic charge eliminator 30. Table 1 illustrates the results.

TABLE 1

| | | Transfer Voltage (kV) | | | | | |
|---|---|---|---|---|---|---|---|
| | | 1.0 | 2.0 | 3.0 | 4.0 | 5.0 | 6.0 |
| Without Charge Eliminator | Secondary Transfer Roller Surface Potential (kV) | 0.9 | 1.8 | 2.8 | 3.8 | 4.7 | 5.6 |
| | Transfer Current TAI (μA) | 2.5 | 4.0 | 6.0 | 8.0 | 10 | 15 |
| With Charge Eliminator | Secondary Transfer Roller Surface Potential (kV) | 0.9 | 1.8 | 2.2 | 2.7 | 3.5 | 4.3 |
| | Transfer Current TAI (μA) | 2.5 | 4.0 | 6.0 | 8.0 | 10 | 15 |
| | Electrostatic charge removal Current JAI (μA) | 0 | 0 | 1.0 | 3.0 | 5.0 | 9.0 |

Figure 4:
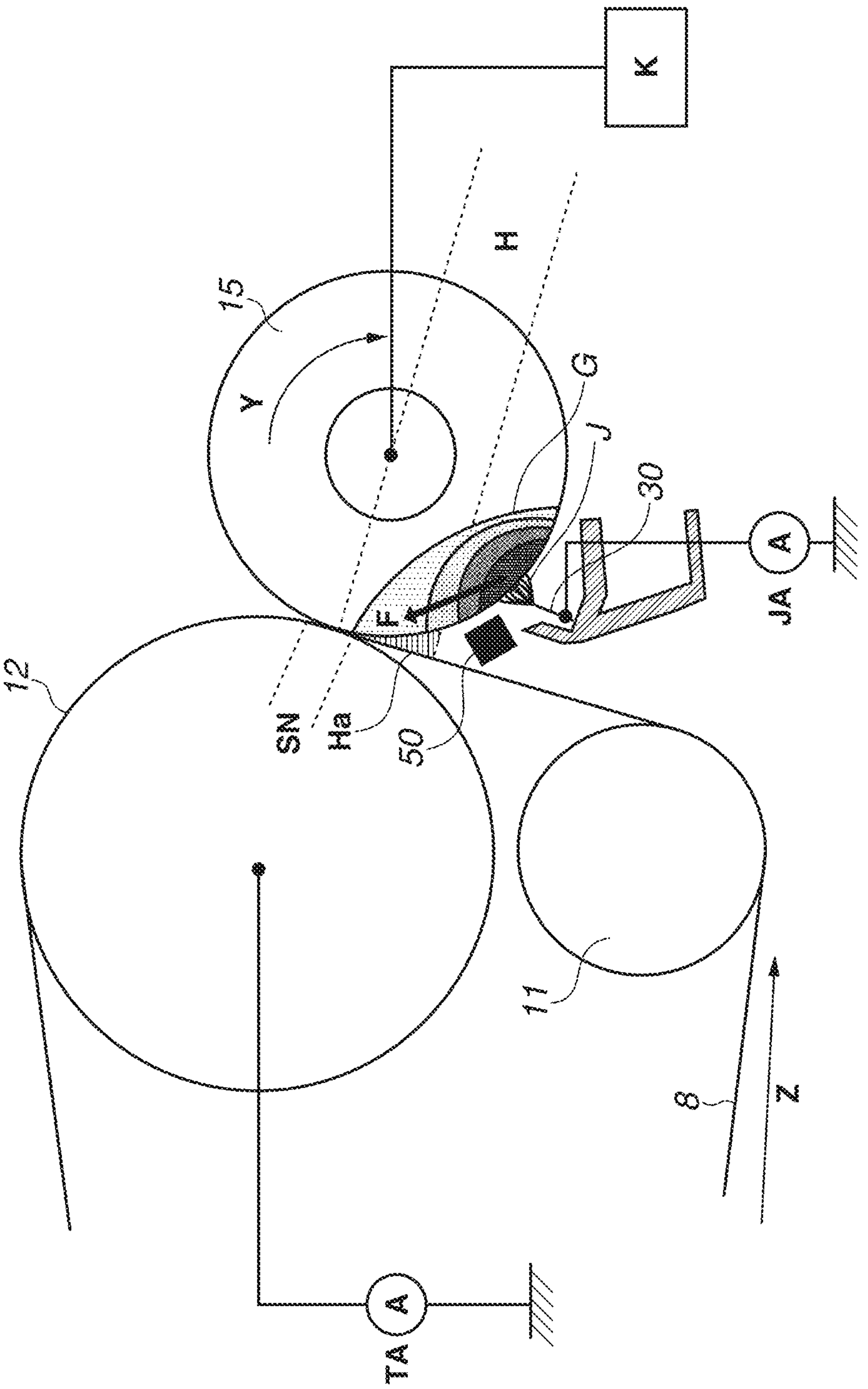
FIG. 4 is a schematic diagram illustrating an electrostatic charge removal effect according to the first embodiment.

The mechanism of this phenomenon, along with the reasons for the above results, will be illustrated with reference to FIG. 4. FIG. 4 is a cross-sectional diagram of the proximity of the secondary transfer portion T during image formation, and is a schematic diagram illustrating a timing at which the pre-transfer electrostatic charge eliminator 30 removed the electrostatic charge from the surface of the secondary transfer roller 15 during this experiment. An electrostatic charge removal current (ion current) J is generated from the leading end 30*a* of the pre-transfer electrostatic charge eliminator 30 toward the secondary transfer roller 15. This removes electrostatic charge from the surface of the secondary transfer roller 15. A charge-removed area (dot pattern filled portion in FIG. 4) is a charge-removed area G. The surface potential of the charge-removed area G is lowest (with the smallest absolute value of potential) at a position directly below the pre-transfer electrostatic charge eliminator 30, and gradually recovers toward an arrow F direction (direction away from the pre-transfer electrostatic charge eliminator 30 and toward the secondary transfer nip portion SN), eventually returning to the original potential. The charge-removed area G exerts influence up to the position of the electric discharge region Ha, and decrease in the surface potential of the secondary transfer roller 15 in the electric discharge region Ha reduces the electric field of the electric discharge region Ha. In this experiment, the potential restored by the time it reaches the secondary transfer nip portion SN, and the potential difference formed between the metal core 15*b* of the secondary transfer roller 15 and the secondary transfer nip portion SN is maintained, ensuring that the current to be used for transfer is sustained.

It is not always necessary to set the charge-removed area G at a position anterior to the secondary transfer nip portion SN.

For example, even if the charge-removed area G overlaps with the secondary transfer nip portion SN, it is sufficient that the range of the charge-removed area G is appropriately adjusted depending on the configuration of the image forming apparatus 500 by, for example, adjusting an applied voltage to a voltage to be applied for transfer.

According to this experiment, in a state in which the pre-transfer electrostatic charge eliminator 30 is arranged as illustrated in Table 1, it was observed that, if a transfer voltage reached 3.0 kV, a current flowed to the pre-transfer electrostatic charge eliminator 30. It can be seen that the surface potential of the secondary transfer roller 15 is reduced as compared with a state in which the pre-transfer electrostatic charge eliminator 30 is not arranged. That is, it is indicated that, in a case where it is necessary to select a transfer voltage of 3.0 kV or more, electrostatic charge is removed from the surface of the secondary transfer roller 15 by the pre-transfer electrostatic charge eliminator 30, and electric discharge at the upstream of transfer can be prevented. On the other hand, it is indicated that, under a condition where a transfer voltage of 2.0 kV or less can be selected and there is less concern about an image defect attributed to electric discharge at the upstream of transfer, it is possible to avoid flowing an electrostatic charge removal current. The transfer current TAI has the same correlation between a transfer voltage and a transfer current irrespective of the presence or absence of the pre-transfer electrostatic charge eliminator 30. This indicates that, by arranging the pre-transfer electrostatic charge eliminator 30 at the upstream of transfer, it is possible to decrease the surface potential of the secondary transfer roller 15 at the upstream of transfer while ensuring a transfer current to be applied for transfer.

[Confirmation of Effect by Experiment]

Subsequently, to confirm an actual electric discharge prevention effect of the present embodiment, the transfer material S was passed under an environment with a room temperature of 15° C. and a humidity of 10%, and whether an electric discharge image defect occurs was checked.

A transfer voltage was varied between 1.0 kV and 5.0 kV, a generation margin of an image defect attributed to transfer voltage shortage and an image defect attributed to transfer upstream electric discharge was checked. As a comparative example, an image forming apparatus not including the pre-transfer electrostatic charge eliminator 30 was prepared, and the comparison examination of the embodiment and the comparative example was conducted. To check the effect more accurately, conditions of the transfer material S including a condition (experiment i) where ordinary use is assumed, and a severe condition (experiment ii) as compared with the ordinary use were prepared, and effects of the first embodiment and the comparative example were compared.

<Experiment Condition i: Condition where Ordinary Use is Assumed>

As a sheet serving as the transfer material S, a sheet with 80 g/m$^2$ (GFC-081 (manufactured by Canon Inc.), A4 sheet size) and a water content ratio of 3.3% (measured by paper moisture meter Moistrex MX 8000) that had been left in the above-described environment for 48 hours was used.

<Experiment Condition ii: Severe Condition>

As a sheet serving as the transfer material S, a sheet with 163 g/m$^2$ (Xerox163, LTR sheet size) and water content ratio of 2.9% (measured by paper moisture meter Moistrex MX 8000) that had been left in the above-described environment for a week was used.

The occurrence of image defects was visually evaluated. In the table, "Occurred" indicates that an image defect occurred, and "Minor" indicates that an image defect occurred but does not affect practical use. "None" indicates that no image defect occurred. Evaluation results are indicated below. Table 2 illustrates results of the experiment i and Table 3 shows results of the experiment ii.

TABLE 2

| Experiment Condition i | | Transfer Voltage (kV) 1.0 | 2.0 | 3.0 | 4.0 | 5.0 |
|---|---|---|---|---|---|---|
| Comparative Example Without Charge Eliminator | Transfer Voltage Shortage Image Defect | Occurred | Minor | None | None | None |
| | Transfer Upstream Electric Discharge Image Defect | None | None | None | None | Occurred |
| First Embodiment With Charge Eliminator | Transfer Voltage Shortage Image Defect | Occurred | Occurred | None | None | None |
| | Transfer Upstream Electric Discharge Image Defect | None | None | None | None | None |

TABLE 3

| Experiment Condition ii | | Transfer Voltage (kV) 1.0 | 2.0 | 3.0 | 4.0 | 5.0 |
|---|---|---|---|---|---|---|
| Comparative Example Without Charge Eliminator | Transfer Voltage Shortage Image Defect | Occurred | Occurred | None | None | None |
| | Transfer Upstream Electric Discharge Image Defect | None | None | Minor | Occurred | Occurred |
| First Embodiment With Charge Eliminator | Transfer Voltage Shortage Image Defect | Occurred | Occurred | None | None | None |
| | Transfer Upstream Electric Discharge Image Defect | None | None | None | None | Occurred |

Based on the above-described results, a description will be provided of a case where frequently used types of paper are used after being left in a low temperature and low humidity environment, as in the experiment i. As illustrated in Table 2, in the configuration of the comparative example that does not include the pre-transfer electrostatic charge eliminator 30, if a high transfer voltage (3.0 kV or more) is selected to prevent a transfer voltage shortage image defect, a transfer upstream electric discharge image defect occurs at 5.0 kV. As illustrated in FIGS. 2 to 4, if a transfer voltage applied to the secondary transfer roller 15 becomes large, an electric field of the electric discharge region H becomes stronger, and if the transfer material S is conveyed in this state, the rear surface of the transfer material S is strongly charged in the electric discharge region Ha. In the electric discharge region Hb, abnormal electrical discharge occurs between the front surface of the transfer material S and the intermediate transfer belt 8, and the potential of toner on the intermediate transfer belt 8 is disturbed, resulting in an image defect. In contrast, in the configuration of the present embodiment, a transfer upstream electric discharge image defect does not occur even at 5.0 kV. This is because, by arranging the pre-transfer electrostatic charge eliminator 30 at the upstream of transfer, the surface potential of the secondary transfer roller 15 at the upstream of transfer can be decreased while a transfer current to be applied for transfer is ensured. In the configuration of the first embodiment, depending on the state of the secondary transfer roller 15 or the resistance of paper serving as the transfer material S, an adequate image state can be maintained even in a case where a high transfer voltage is selected.

Next, a case where the image forming apparatus was used under a severe condition as in the experiment ii will be described. The transfer material S left under the condition of the experiment ii is dry, so that the resistance of the transfer material S becomes higher, a transfer current to be applied for transfer becomes larger, and electric discharge easily occurs. The transfer material S with large grammage has a thick paper thickness and high paper elasticity, so that an airspace easily occurs between the transfer material S and the intermediate transfer belt 8. For this reason, because electric discharge easily occurs due to the airspace, an image defect easily occurs.

As illustrated in Table 3, in the configuration of the comparative example that does not include the pre-transfer electrostatic charge eliminator 30, if a high transfer voltage (3.0 kV or more) is selected to prevent an image defect attributed to transfer voltage shortage, a transfer upstream electric discharge image defect starts to be generated. Accordingly, in the configuration of the comparative example, there is no adequate image margin under the above-described condition. In contrast, in the configuration of the present embodiment that includes the pre-transfer electrostatic charge eliminator 30, when a transfer voltage is 3.0 kV to 4.0 kV, an adequate margin where neither an image defect attributed to transfer voltage shortage nor a transfer upstream electric discharge image defect occurs is obtained. Even under the condition as that in the experiment ii, the configuration of the first embodiment can reduce the surface potential of the secondary transfer roller 15 at the upstream of transfer while ensuring a transfer current to be applied for transfer.

As described above, in the configuration of the present embodiment, the pre-transfer electrostatic charge eliminator 30 removes the electrostatic charge from the surface potential of the secondary transfer roller 15 at the upstream in the rotational direction, so that the following effects are obtained. More specifically, even in a case where a high transfer voltage is to be selected, for example, in low-temperature low-humidity environment or with high-resistance paper, the configuration of the present embodiment can reduce an electric field formed at the upstream of the secondary transfer nip portion SN, and prevent an image defect attributed to electric discharge that occurs at the upstream of the secondary transfer nip portion SN. Additionally, under a condition where a low transfer voltage can be selected and there is no concern about an image defect attributed to electric discharge at the upstream of the secondary transfer nip portion SN, for example, in room-temperature environment or high-temperature and high-humidity environment, the configuration of the present embodiment can make adjustment so as to prevent the occurrence of an electrostatic charge removal current.

The configuration of the first embodiment has the following features. An image forming apparatus that can execute an image formation operation of forming an image on the transfer material S includes the intermediate transfer belt 8 of which the surface is movable. The image forming apparatus includes the rotatable secondary transfer roller 15 configured to be brought into contact with the surface of the intermediate transfer belt 8 to form the secondary transfer nip portion SN, and transfer the toner 90 supplied to the surface of the intermediate transfer belt 8, to the transfer material S at the secondary transfer nip portion SN. The image forming apparatus includes the pre-transfer electrostatic charge eliminator 30 that removes electrostatic charge from the surface of the secondary transfer roller 15 at a counter portion facing the surface of the secondary transfer roller 15 at the upstream of both the secondary transfer nip portion SN in the rotational direction of the secondary transfer roller 15 and the secondary transfer nip portion SN in the moving direction of the transfer material S. The image forming apparatus includes the secondary transfer power source 74 that applies a transfer voltage to the secondary transfer roller 15, the drive unit 60 that drives the intermediate transfer belt 8, and the control unit 502 that controls the secondary transfer power source 74 and the drive unit 60. The control unit 502 performs control in such a manner that, in the image formation operation, a transfer voltage is applied to the secondary transfer roller 15 in a state in which the secondary transfer roller 15 is rotating by driving the intermediate transfer belt 8. The pre-transfer electrostatic charge eliminator 30 is arranged in such a manner that, in the image formation operation, an absolute value of the surface potential of the secondary transfer roller 15 at the counter portion is lower than an absolute value of the surface potential of the secondary transfer roller 15 at the secondary transfer nip portion SN. A counter member that is in contact with the inner surface of the intermediate transfer belt 8 and faces the secondary transfer roller 15 is included, and the secondary transfer nip portion SN is formed by the intermediate transfer belt 8, the secondary transfer roller 15, and the counter member. The polarity of the transfer voltage is opposite to the normal polarity of the toner 90. In a cross-section orthogonal to a rotational axis of the secondary transfer roller 15, the pre-transfer electrostatic charge eliminator 30 is arranged in a region where the secondary transfer roller 15 is arranged, out of regions defined by a tangent line of the secondary transfer roller 15 and the intermediate transfer belt 8. The pre-transfer electrostatic charge eliminator 30 is arranged at a position where the pre-transfer electrostatic charge eliminator 30 does not come into contact with the secondary transfer roller 15. A transfer voltage in the image formation operation is set to a voltage at which electric discharge with the pre-transfer electrostatic charge eliminator 30 occurs. The pre-transfer electrostatic charge eliminator 30 is arranged at a position at which the pre-transfer electrostatic charge eliminator 30 does not come into contact with the transfer material S. The pre-transfer electrostatic charge eliminator 30 forms the counter portion at the upstream, in the rotational direction of the secondary transfer roller 15, of a region where electric discharge occurs between the secondary transfer roller 15 and the intermediate transfer belt 8. The control unit 502 performs control in such a manner that an image formation operation and furthermore, a non-image formation operation in which no image formation on the transfer material S is performed can be executed. The control is performed in such a manner that, in the image formation operation, a transfer voltage is applied to the secondary transfer roller 15 in a state in which the secondary transfer roller 15 is rotating by driving the intermediate transfer belt 8. The pre-transfer electrostatic charge eliminator 30 is arranged in such a manner that an absolute value of the surface potential of the secondary transfer roller 15 at the counter portion is lower than an absolute value of the surface potential of the secondary transfer roller 15 at the secondary transfer nip portion SN. Here, the non-image formation operation is a pre-rotation operation to be executed before the image formation operation. The non-image formation operation may be a post-rotation operation to be executed after the image formation operation. In a case where a first image formation operation and a second image formation operation which is an image formation operation to be executed after the first image formation operation are consecutively executed, the non-image formation operation may be a paper-interval operation to be executed between the first image formation operation and the second image formation operation.

Figure 8:
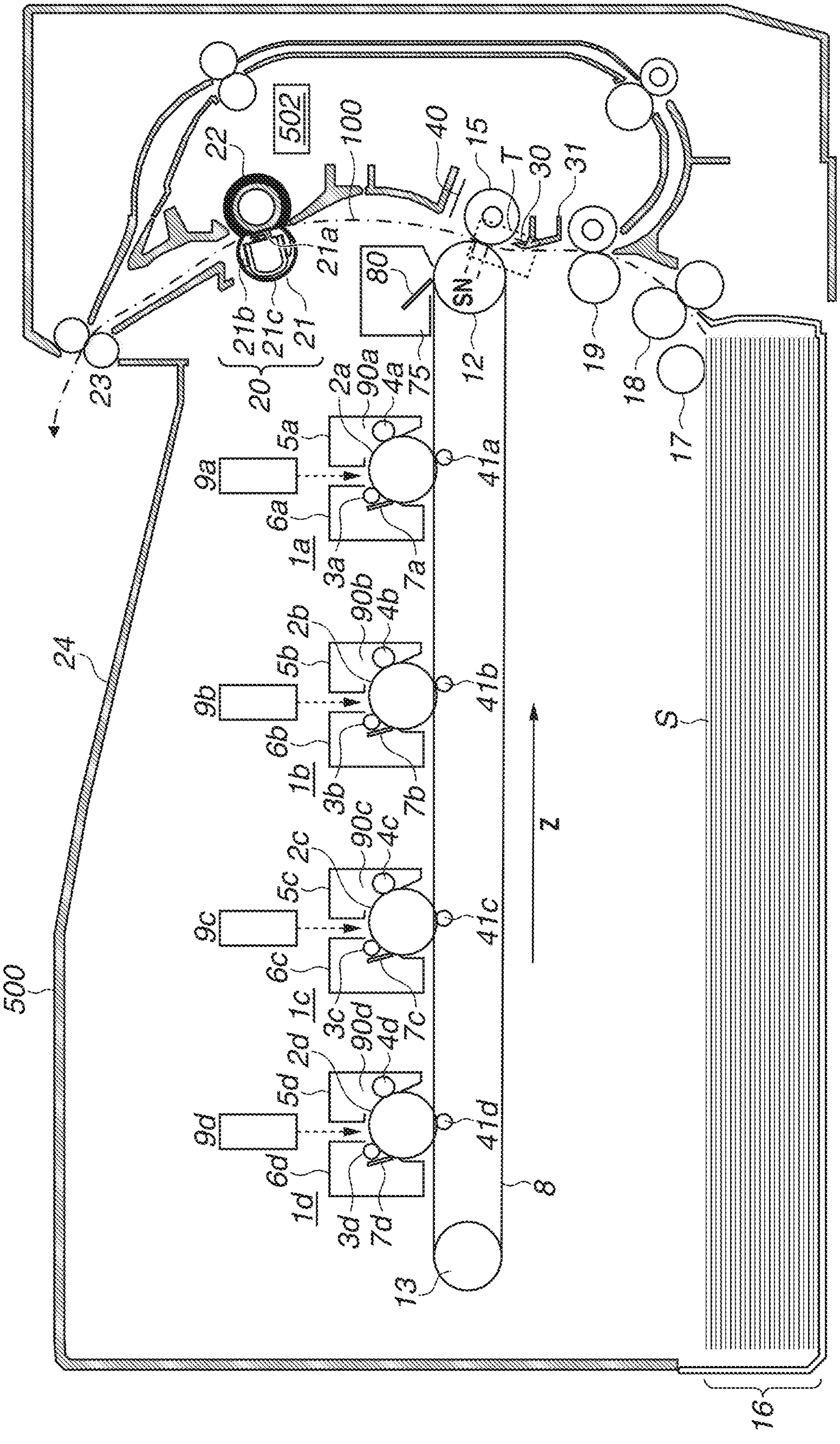
FIG. 8 is a diagram illustrating an image forming apparatus according to another embodiment.

In the present embodiment, the distance between the pre-transfer electrostatic charge eliminator 30 and the secondary transfer roller 15 is 3 mm, but the distance may be suitably set depending on the configuration and the characteristics of the secondary transfer roller 15. If the surface potential of the secondary transfer roller 15 is desired to be further decreased, the distance may be made further shorter. For example, in a configuration in which the intermediate transfer belt 8 is stretched with two shafts as illustrated in FIG. 8, instead of a configuration in which the intermediate transfer belt 8 is stretched with three shafts as in the present embodiment, a gap between the transfer material S and the intermediate transfer belt 8 easily becomes larger, and electric discharge easily occurs strongly at the upstream of the secondary transfer nip portion SN. Accordingly, in such a configuration, it is effective to make a distance between the pre-transfer electrostatic charge eliminator 30 and the secondary transfer roller 15 shorter. Thus, the present disclosure is applicable also to the configuration in which the intermediate transfer belt 8 is stretched with two shafts corresponding to the secondary transfer counter roller 12 and the tension roller 13 as illustrated in FIG. 8, without using the assist roller 11. In a case where it is desirable that the surface potential of the secondary transfer roller 15 be not decreased more than appropriate, it is sufficient that the distance is set larger than 3 mm.

In the configuration of conveying the transfer material S to the secondary transfer nip portion SN along the intermediate transfer belt 8, the influence on an image defect attributed to electric discharge in the configuration in FIG. 8 becomes more prominent as compared with the configuration in FIG. 1. Also in such a configuration in FIG. 8, the configuration of the present embodiment produces a special effect. That is, also in the configuration as illustrated in FIG. 8, it is possible to prevent an image defect attributed to electric discharge that occurs at the secondary transfer portion T.

The effect of the present disclosure is not limited to a color image forming apparatus configuration. For example, also in a direct transfer configuration such as monochrome image forming apparatus, a similar effect is obtained by removing electrostatic charge from the surface potential at a transfer member upstream. Accordingly, the present disclosure is applicable also to a relationship between a photosensitive drum and a transfer roller. The shape of an electrostatic charge eliminator is not limited as long as the pre-transfer electrostatic charge removal member 30 is not in contact, and an electrostatic charge removal brush or an electrostatic charge removal cloth is selectable.

<Configuration of Conveyance Guide of Present Embodiment>

Figure 9:
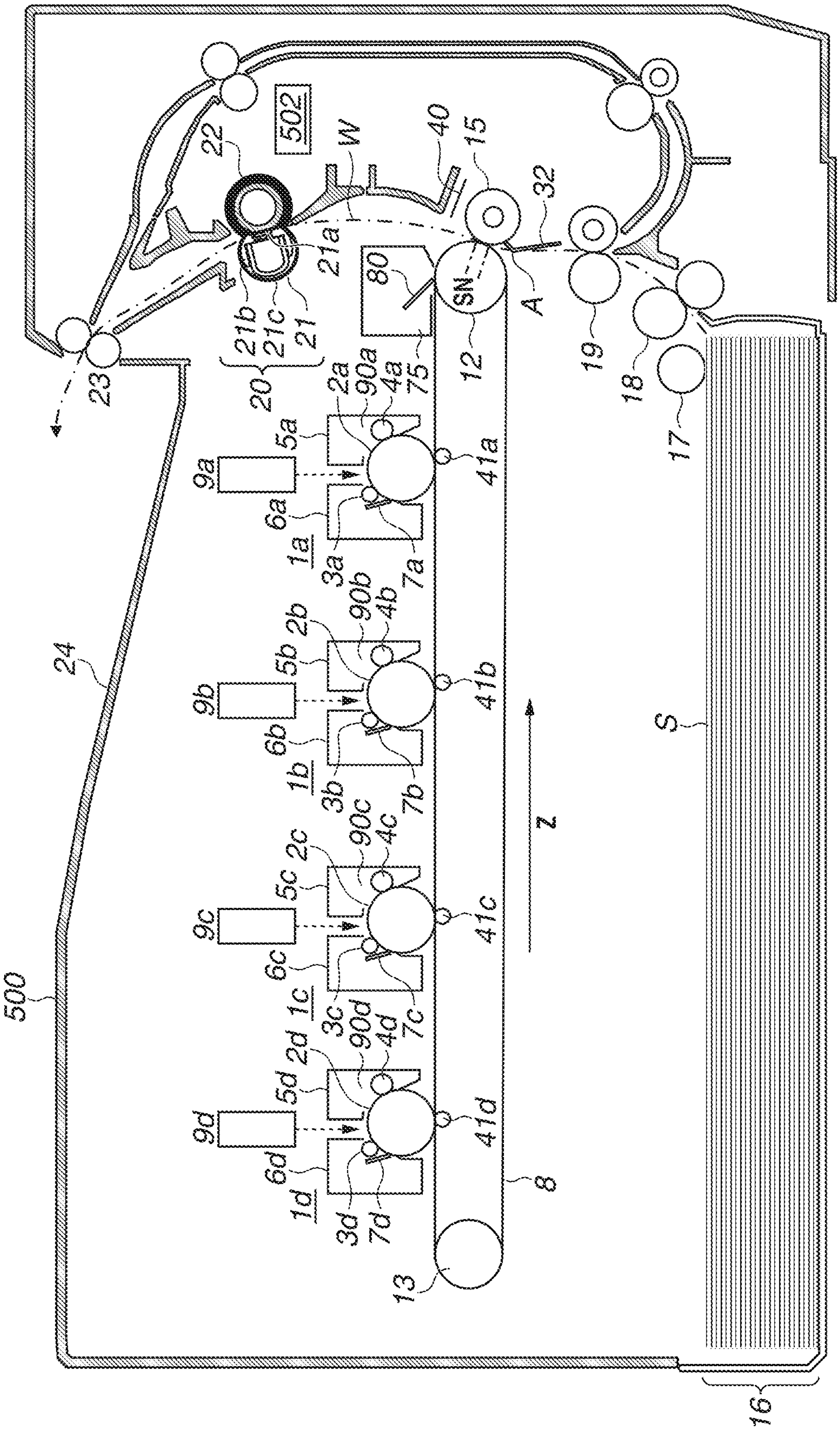
FIG. 9 is a diagram illustrating an image forming apparatus according to a second embodiment.

A second embodiment of the present disclosure will be described. A configuration of a conveyance guide 32 according to the present embodiment will be initially described with reference to FIG. 9.

In the present embodiment, the conveyance guide 32 is formed by molding an iron sheet metal with a thickness of 1.0 mm, and the conveyance guide 32 includes both of a regulation portion A serving as a guide portion of a recording material S which is the transfer material S, and an electrostatic charge removal portion B for releasing a transfer current by being brought into contact with the secondary transfer roller 15. Hereinafter, the details of the configuration of the conveyance guide 32 according to the present embodiment will be described.

Figure 10:
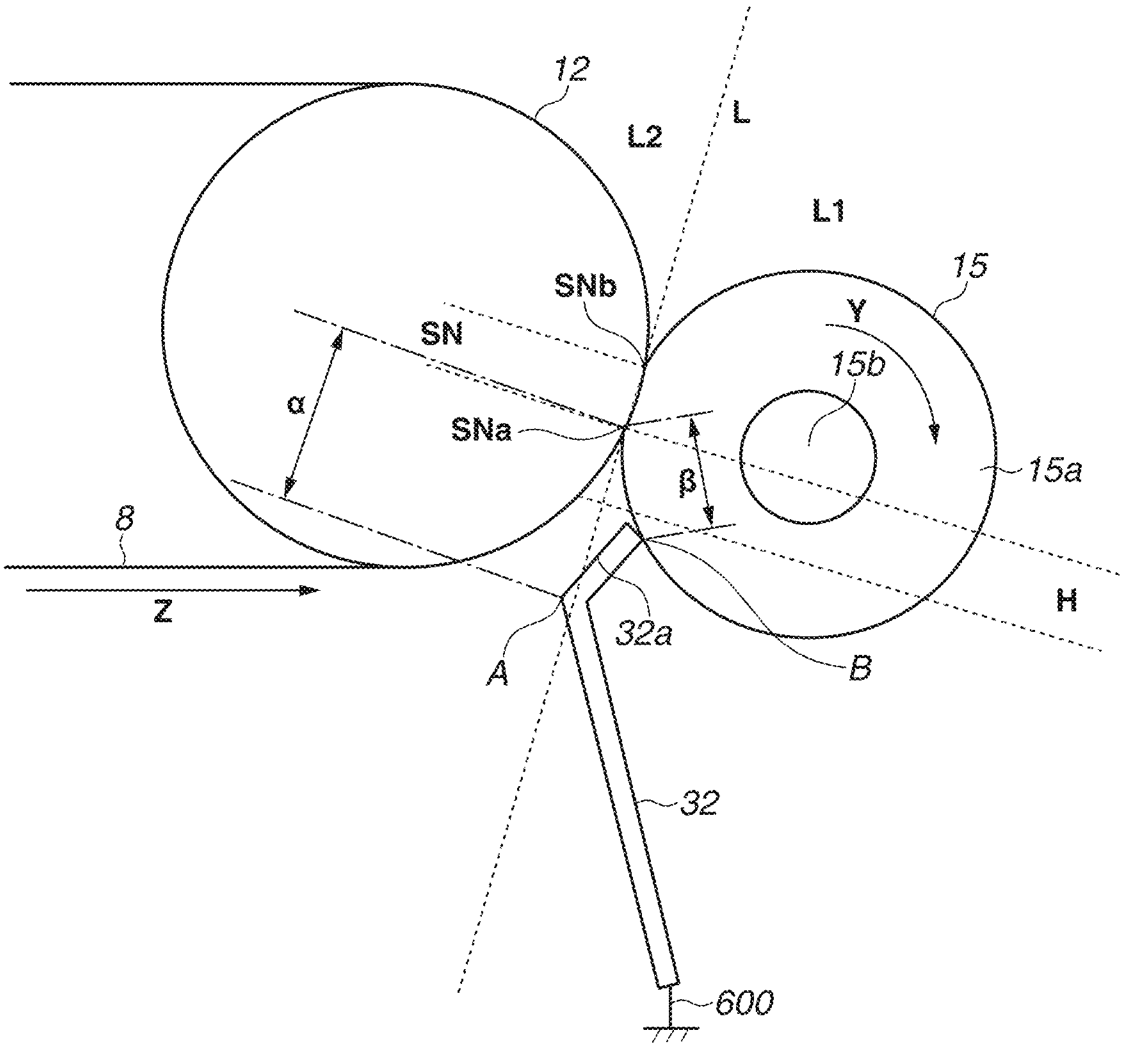
FIG. 10 is an enlarged view illustrating a secondary transfer portion according to the second embodiment.

The conveyance guide 32 includes the regulation portion A protruding toward the secondary transfer counter roller 12, and an inclined guide portion **32*a* that is inclined away from the conveyance path of the recording material S, from the regulation portion A toward the downstream in the conveyance direction of the recording material S. A downstream end of the inclined guide portion 32*a* in the conveyance direction of the recording material S is in contact with the secondary transfer roller 15 serving as an electrostatic charge removal member in the electrostatic charge removal portion B, and the conveyance guide 32 is electrically grounded via a conductive path 600 as illustrated in FIG. 10. This configuration can prevent void spots resulting from a transfer current released from the secondary transfer roller 15 via the conveyance guide 32 during application of a secondary transfer voltage. The void spots are image defects caused by abnormal discharge occurring between the recording material S and the intermediate transfer belt 8 in the electric discharge region H formed just before the secondary transfer nip portion SN, resulting in the toner image in the abnormal discharge region not being transferred and thus missing. In this manner, the conveyance guide 32 that includes the regulation portion A and the electrostatic charge removal portion B increase the flexibility of arrangement, allowing the regulation portion A and the charge elimination portion B to be positioned further upstream of the nip portion SN. In the present embodiment, a distance $\alpha$ from the regulation portion A to an entrance SNa of the nip portion SN is set to 5 mm. A shorter distance $\alpha$ enables more stable guidance of the leading end of the recording material S to the nip portion SN. A distance $\beta$ from the electrostatic charge removal portion B to the entrance SNa of the nip portion SN is set to 3 mm. As the distance $\beta$ is reduced, the surface potential of the secondary transfer roller 15** in the electric discharge region H decreases, thus increasing void spot prevention effect. In the configuration of the present embodiment, because the regulation portion A and the electrostatic charge removal portion B are formed of the same member, a manufacturing variation in relative positional relationship between the regulation portion A and the electrostatic charge removal portion B is prevented or reduced, which is more advantageous to achieve both the void spot prevention and improvement of conveyance performance.

In the present embodiment, the regulation portion A of the conveyance guide 32 is arranged in such a manner as to be located in a region L2 on an opposite side (the secondary transfer counter roller 12 side) of the secondary transfer roller 15 across a straight line L connecting the entrance SNa and an exit SNb of the transfer nip SN. By arranging the regulation portion A in this manner, the conveyance path of the recording material S that is regulated by the regulation portion A gets closer to the intermediate transfer belt 8 in the electric discharge region H. Thus, a short distance between the recording material S and the intermediate transfer belt 8 in the electric discharge region H makes abnormal electrical discharges less likely to occur, thus further preventing void spots. A toner image print range in the recording material S of the image forming apparatus of the present embodiment is a range up to 5 mm from the trailing edge of the recording material S, and a 5-mm region from the trailing edge of the recording material S is left blank. By setting the distance α to a distance equal to the length of the blank region or less as in the present embodiment, it is also possible to prevent void spots in the toner image in the proximity of the trailing edge of the recording material S.

In the present embodiment, the conveyance guide 32 includes, at the downstream of the regulation portion A in the conveyance direction of the recording material S, the inclined guide portion 32*a* that is inclined toward the secondary transfer roller 15 in a direction orthogonal to the straight line L, from the regulation portion A toward the downstream in the conveyance direction of the recording material S. The electrostatic charge removal portion B is formed at the leading end of the inclined guide portion 32*a*. As described above, in the cross section orthogonal to the rotational axis of the secondary transfer roller 15, the regulation portion A is arranged in a region L2 where the intermediate transfer belt 8 is arranged, out of regions L1 and L2 defined by the tangent line L of the transfer nip portion SN. The electrostatic charge removal portion B is arranged in the region L1 where the secondary transfer roller 15 is arranged, out of the regions L1 and L2 defined by the tangent line L of the secondary transfer roller 15 and the intermediate transfer belt 8. A downstream end of the inclined guide portion 32*a* in the conveyance direction of the recording material S is arranged in the region L1 where the secondary transfer roller 15 is arranged, out of the regions L1 and L2 defined by the tangent line L of the transfer nip portion SN.

<Evaluation Test>

To confirm the effect of the present embodiment, the recording material S was passed under an environment with a room temperature of 15° C. and a humidity of 10% where void spots easily occur, and the occurrence of void spots and the conveyance performance were evaluated. The image forming apparatuses used for the evaluation included three types: one in a second embodiment as the present embodiment, and those in Comparative Examples 1 and 2 as conventional configurations.

Figure 11A:
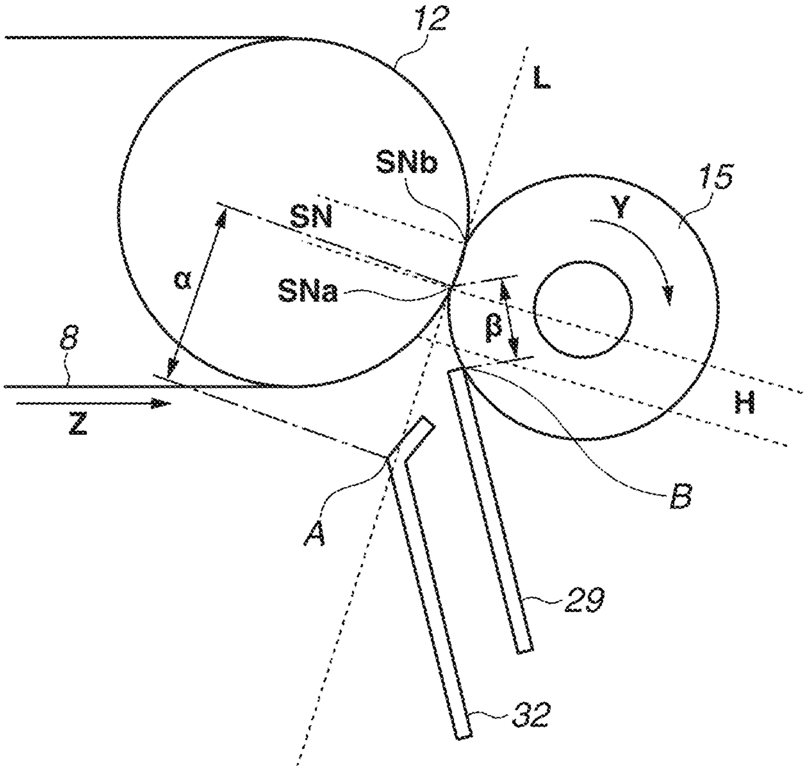
FIGS. 11A and 11B are enlarged views of a secondary transfer portion according to Comparative Examples 1 and 2.
Figure 11B:
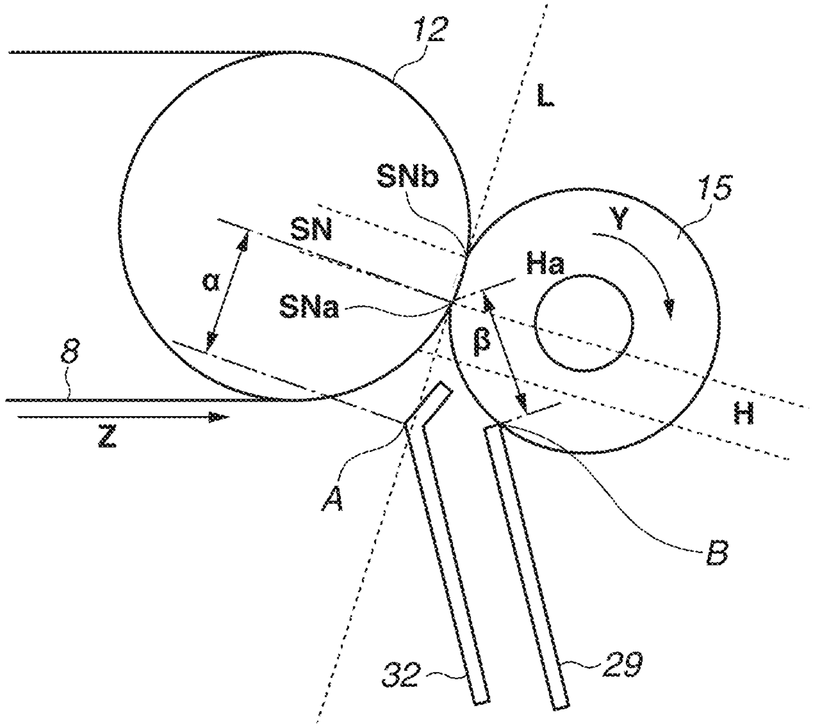

The configurations of Comparative Examples 1 and 2 will be described with reference to FIGS. 11A and 11B, respectively. In Comparative Examples 1 and 2, the conveyance guide 32 including the conventional regulation portion A, and a contact electrode 29 including the electrostatic charge removal portion B are arranged as separate members. Comparative Example 1 has a configuration in which the electrostatic charge removal portion B is set at the same position as that in the second embodiment, and the regulation portion A is brought closer to the nip without the contact electrode 29 and the conveyance guide 32 interfering with each other even if an individual variation is considered. Specifically, the distance from the regulation portion A of Comparative Example 1 to the entrance SNa of the nip portion SN was set to 9 mm, and the distance from the electrostatic charge removal portion B to the entrance SN a of the nip portion SN was set to 3 mm. In contrast, Comparative Example 2 has a configuration in which the regulation portion A is set at the same position as that in the second embodiment, and the electrostatic charge removal portion B is brought closer to the nip without the contact electrode 29 and the conveyance guide 32 interfering with each other even if an individual variation is considered. Specifically, the distance from the regulation portion A of Comparative Example 2 to the entrance SNa of the nip portion SN was set to 5 mm, and the distance from the electrostatic charge removal portion B to the entrance SNa of the nip portion SN was set to 6 mm.

An evaluation method for the occurrence of void spots and the conveyance performance is as described below.

Void Spots Evaluation Method:

The recording material S used was a sheet with 163 g/m$^2$ (Vitality (Xerox corporation), LTR sheet size), which is prone to void spots. This paper was left in the above-described environment for a week to dry. The sheet with a water content ratio of 2.9% (measured by paper moisture meter Moistrex MX 8000) was used, and whole-area black images were printed on ten sheets. If no visually recognizable void spot is present in any of the printed toner images, the evaluation result was marked OK. If a visually recognizable void spot is present in any of them, the evaluation result was marked unacceptable.

Conveyance Performance Evaluation Method:

The recording material S used was a sheet with 60 g/m$^2$ (CS-060F manufactured by Canon Inc., A4 sheet size), which has poor conveyance performance. This paper was left in the above-described environment for a week to dry. The sheet with a water content ratio of 2.9% (measured by paper moisture meter Moistrex MX 8000) was used, and whole-area black images were printed on ten sheets. If no crease or damage was observed on the leading edges of the printed sheet, the evaluation result was marked as OK. If a crease or damage was observed on any of these sheets, the evaluation result was marked unacceptable.

Table 4 illustrates the evaluation results.

TABLE 4

| | Void spots | Conveyance Performance |
|---|---|---|
| Comparative Example 1 | OK | Unacceptable |
| Comparative Example 2 | Unacceptable | OK |
| Second Embodiment | OK | OK |

As illustrated in Table 4, in Comparative Example 1, while the occurrence of void spots was evaluated as OK, conveyance performance was evaluated as unacceptable. The conveyance performance was evaluated as unacceptable because, although the electrostatic charge removal portion B was close to the conveyance path of the recording material S, the regulation portion A is too far from the nip portion. As a result, the leading end of the recording material S came into contact with the electrostatic charge removal portion B and the recording material S was partially folded.

In Comparative Example 2, in contrast to Comparative Example 1, although conveyance performance was evaluated as OK because the regulation portion A was close to the transfer nip SN, the occurrence of void spots was evaluated as unacceptable. This is because the electrostatic charge removal portion B was too far from the transfer nip SN, so that the prevention of electric discharge by the electric field formed in the electric discharge region H was insufficient. In contrast to these, regarding the second embodiment, the electrostatic charge removal portion B is positioned close to the transfer nip SN so that void spots were evaluated as OK. Additionally the regulation portion A is positioned close to the transfer nip SN so that the conveyance variability for the recording material S is controlled, resulting in sufficient conveyance performance.

As described above, in the case of the configuration of the present embodiment, it was possible to prevent void spots without impairing paper conveyance performance under conditions prone to void spots.

The configuration of the second embodiment has the following features.

The image forming apparatus of the second embodiment includes the intermediate transfer belt 8, and the rotatable secondary transfer roller 15 configured to be brought into contact with a surface of the intermediate transfer belt 8 to form the transfer nip portion SN, and transfer, to a recording material S, the toner 90 supplied to the surface of the intermediate transfer belt 8, at the transfer nip portion SN. The image forming apparatus includes the conveyance guide 32 that guides the recording material S in such a manner as to be conveyed to the transfer nip portion SN. The conveyance guide 32 includes the regulation portion A that guides the conveyance of the recording material S to the transfer nip portion SN by being brought into contact with an opposite surface to the surface of the recording material S to which the toner 90 is transferred. The image forming apparatus further includes the electrostatic charge removal portion B that removes the electrostatic charge from the surface of the secondary transfer roller 15 at the counter portion facing the surface of the secondary transfer roller 15 at the upstream of the transfer nip portion SN both in the rotational direction of the secondary transfer roller 15 and in the moving direction of the recording material S. The image forming apparatus includes the secondary transfer power source 74 that applies a transfer voltage to the secondary transfer roller 15. The electrostatic charge removal portion B removes electrostatic charge from the surface of the secondary transfer roller 15 at the counter portion in a state in which the transfer voltage is applied to the secondary transfer roller 15. The electrostatic charge removal portion B is in contact with the secondary transfer roller 15 at the counter portion. In the cross section orthogonal to the rotational axis of the secondary transfer roller 15, the regulation portion A is arranged in the region L2 where the intermediate transfer belt 8 is arranged, out of the regions L1 and L2 defined by the tangent line L of the transfer nip portion SN. The conveyance guide 32 further includes the inclined guide portion 32*a* inclined toward the secondary transfer roller 15, from the regulation portion A. A downstream end of the inclined guide portion 32*a* in the conveyance direction of the recording material S is arranged in the region L1 where the secondary transfer roller 15 is arranged, out of the regions L1 and L2 defined by the tangent line L of the transfer nip portion SN.

The image forming apparatus includes the secondary transfer counter roller 12 serving as a counter member that is in contact with the inner surface of the intermediate transfer belt 8 and faces the secondary transfer roller 15, and the transfer nip portion SN is formed by the intermediate transfer belt 8, the secondary transfer roller 15, and the secondary transfer counter roller 12. The polarity of the transfer voltage is opposite to the normal polarity of the toner 90. In the cross section orthogonal to the rotational axis of the secondary transfer roller 15, the electrostatic charge removal portion B is arranged in the region L1 where the secondary transfer roller 15 is arranged, out of the regions L1 and L2 defined by the tangent line L of the secondary transfer roller 15 and the intermediate transfer belt 8. The transfer voltage is set to a voltage at which electric discharge with the electrostatic charge removal portion B occurs. The electrostatic charge removal portion B forms the counter portion B-B' at the upstream in the rotational direction of the secondary transfer roller 15 of a region where electric discharge occurs between the secondary transfer roller 15 and the intermediate transfer belt 8.

The configuration of an image forming apparatus to which a third embodiment is applied is the same as that of the second embodiment except that the electrostatic charge removal portion B is not in contact with the secondary transfer roller 15, and a configuration of releasing a transfer current from the secondary transfer roller 15 to the electrostatic charge removal portion B by electric discharge is employed. Accordingly, the components having functions and configurations that are the same as or equivalent to those in the second embodiment are assigned the same reference numerals, and the detailed description will be omitted.

Figure 12A:
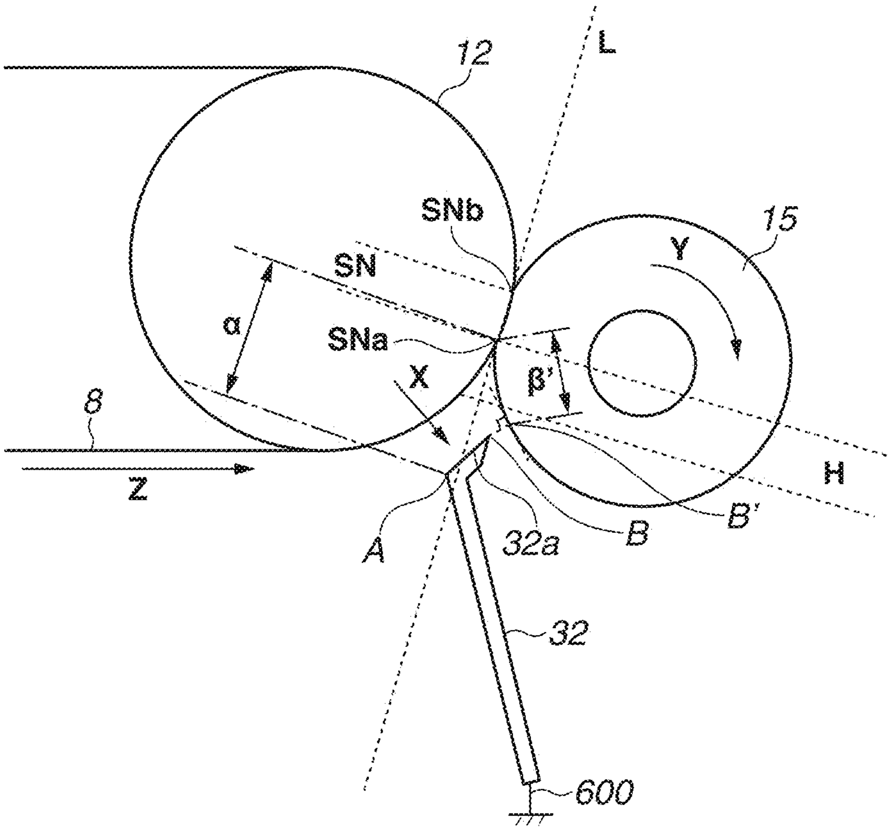
FIGS. 12A and 12B are an enlarged view of a secondary transfer portion and a schematic diagram of a conveyance guide according to a third embodiment.
Figure 12B:
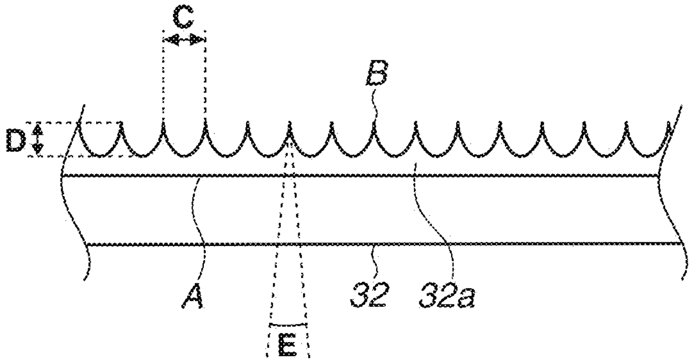

FIG. 12A is an enlarged view illustrating a secondary transfer portion formed by the intermediate transfer belt 8 and the secondary transfer roller 15 and the proximity thereof according to the present embodiment, and FIG. 12B is a schematic diagram illustrating the conveyance guide 32 according to the present embodiment that is viewed from an arrow X direction in FIG. 12A.

As illustrated in FIG. 12A, the conveyance guide 32 of the present embodiment includes the regulation portion A protruding toward the region L2 where the secondary transfer counter roller 12 is arranged, and the inclined guide portion 32*a* that is inclined away from the conveyance path of the recording material S, from the regulation portion A toward the downstream in the conveyance direction of the recording material S. As illustrated in FIG. 12B, a downstream end of the inclined guide portion 32*a* in the conveyance direction of the recording material S includes the electrostatic charge removal portion B as an electrostatic charge removal member. The electrostatic charge removal portion B is an electrostatic charge eliminator processed into a serrated shape, and a pitch C of neighboring serrations is set to 3.5 mm, a length D of the respective serrations is set to 2 mm, and a leading end angle E of the respective serrations is set to 18.9°. The electrostatic charge removal portion B is formed by punching the end of the conveyance guide 32 formed by molding an iron sheet metal with a thickness of 1.0 mm, into a serrate shape using a stamping die, and by performing polishing processing in such a manner that the leading end of the electrostatic charge removal portion B has a thickness of 0.1 mm. The pitch C of each serration is desirably in the range from about 0.5 mm to 8.0 mm because, if the pitch C is too wide, a location from which electrostatic charge is not removed occurs, and if the pitch C is too narrow, the effect of leading end electric discharge is attenuated. The electrostatic charge removal portion B forms the counter portion B-B' at the upstream in the rotational direction of the secondary transfer roller 15 of the region H where electric discharge occurs between the secondary transfer roller 15 and the intermediate transfer belt 8.

The leading end of the electrostatic charge eliminator serving as the electrostatic charge removal portion B is arranged in such a manner that an electrostatic charge eliminator leading end is directed toward the secondary transfer roller 15 in a state of being in noncontact with the secondary transfer roller 15 across a clearance gap of 1 mm.

The conveyance guide 32 is electrically grounded via the conductive path 600. Such a configuration concentrates ion current on the electrostatic charge eliminator leading end of the electrostatic charge removal portion B during application of a secondary transfer voltage, the corona discharge occurs between the electrostatic charge removal portion B and an electrostatic charge removal position B', which decreases the surface potential of the secondary transfer roller 15. Thus, the occurrence of void spots is prevented. The electrostatic charge removal position B' is a position on the surface of the secondary transfer roller 15 where the secondary transfer roller 15 is closest to the electrostatic charge removal portion B, and as illustrated in FIG. 12A, a straight line B-B' is vertical to the tangent line of the surface of the secondary transfer roller 15. If an amount of current generated by the corona discharge increases, the potential at the electrostatic charge removal position B' decreases, increasing the void spot prevention effect. Thus, the electrostatic charge removal portion B is to be arranged in such a manner that the distance between the electrostatic charge removal portion B and the electrostatic charge removal position B' is shorter than the corona discharge initiation distance between the electrostatic charge removal position B' and the electrostatic charge removal portion B. To produce a sufficient void spot prevention effect, an amount of current flowing between the electrostatic charge removal portion B and the electrostatic charge removal position B' due to the corona discharge is desirably equal to or larger than a transfer current flowing through the transfer nip SN.

In this manner, the conveyance guide 32 that includes the regulation portion A and the electrostatic charge removal portion B increases the flexibility of arrangement, allowing the regulation portion A and the charge elimination portion B to be positioned further upstream of the nip portion SN.

In the present embodiment, as in the second embodiment, a distance α from the regulation portion A to an entrance SNa of the nip portion SN is set to 5 mm. A distance β' from the electrostatic charge removal position B' to the entrance SNa of the nip portion SN is set to 3 mm.

As the distance β is reduced, the surface potential of the secondary transfer roller 15 in the electric discharge region H decreases, thus increasing void spot prevention effect. In the configuration of the present embodiment, because the regulation portion A and the electrostatic charge removal portion B are formed of the same member, a manufacturing variation in relative positional relationship between the regulation portion A and the electrostatic charge removal portion B is prevented or reduced, which is more advantageous to achieve both the void spot prevention and improvement of conveyance performance.

By using a non-contact electrostatic charge removal member such as an electrostatic charge eliminator as the electrostatic charge removal portion B as in the present embodiment, a transfer current is released to the electrostatic charge removal portion B without bringing the electrostatic charge removal portion B into contact with the secondary transfer roller 15, which is more advantageous from the aspect of durability of the secondary transfer roller 15 as compared with the configuration of the second embodiment. Nevertheless, in the configuration of the present embodiment, because a gap is to be provided between the electrostatic charge removal portion B and the secondary transfer roller 15, the flexibility of design sometimes declines. Thus, it is sufficient that contact or non-contact of the electrostatic charge removal portion B is selected in accordance with characteristics appropriate for the image forming apparatus.

<Evaluation Test>

To confirm the effect of the present embodiment, a sheet was passed under an environment with a room temperature of 15° C. and a humidity of 10%, and the occurrence of void spots and the conveyance performance were evaluated. The image forming apparatuses used for the evaluation included three types: one in the third embodiment and those in Comparative Examples 3 and 4 as conventional configurations.

Figure 13A:
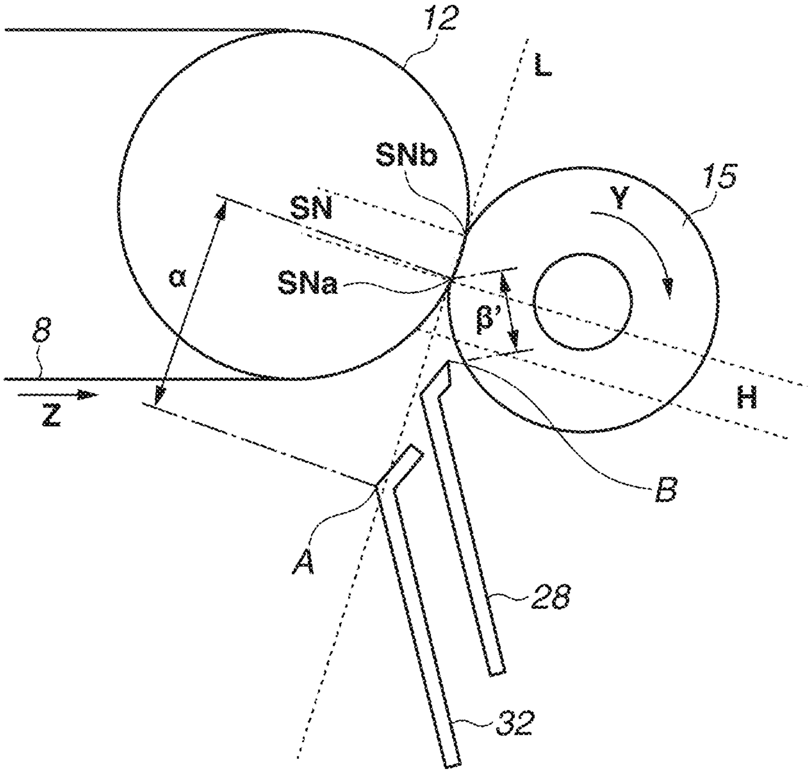
FIGS. 13A and 13B are enlarged views of a secondary transfer portion according to Comparative Examples 3 and 4.
Figure 13B:
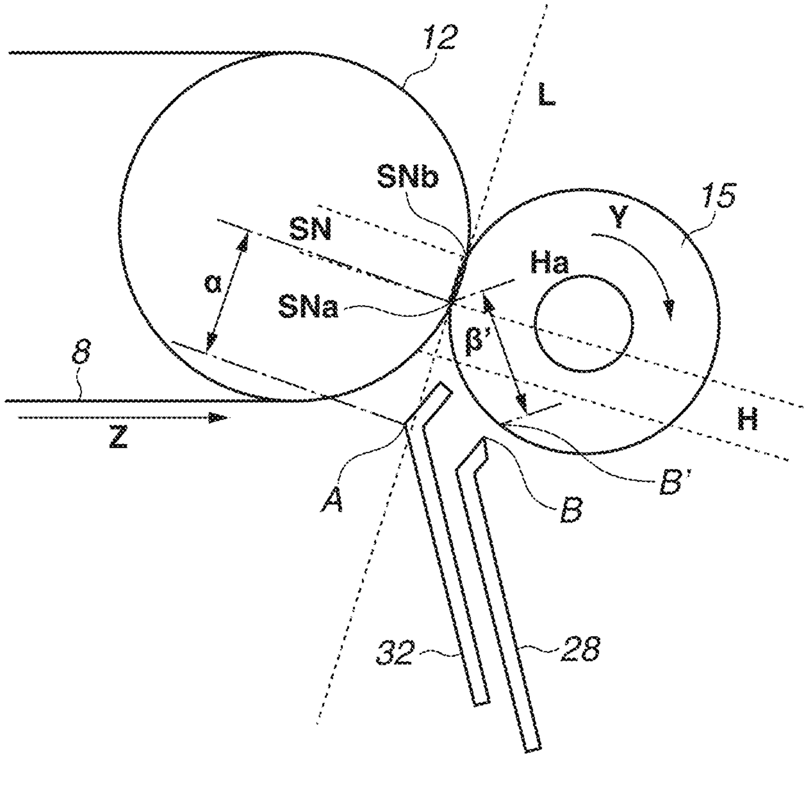

The configurations of Comparative Examples 3 and 4 will be described with reference to FIGS. 13A and 13B, respectively. In Comparative Examples 3 and 4, the conveyance guide 32 including the conventional regulation portion A, and a discharge electrode 28 serving as a non-contact electrode including the electrostatic charge removal portion B are arranged as separate members. Comparative Example 3 has a configuration in which the electrostatic charge removal position B' is set at the same position as that in the third embodiment, and the regulation portion A is brought closer to the nip without the non-contact electrode 28 and the conveyance guide 32 interfering with each other even if an individual variation is considered. Specifically, a distance α from the regulation portion A of Comparative Example 3 to the entrance SNa of the nip portion SN was set to 11 mm, and a distance β' from the electrostatic charge removal position B' to the entrance SNa of the nip portion SN was set to 3 mm. In contrast, Comparative Example 4 has a configuration in which the regulation portion A is set at the same position as that in the third embodiment, and the electrostatic charge removal portion B is brought closer to the nip without the non-contact electrode 28 and the conveyance guide 32 interfering with each other even if an individual variation is considered. Specifically, a distance from the regulation portion A of Comparative Example 4 to the entrance SN a of the nip portion SN was set to 5 mm, and a distance from the electrostatic charge removal portion B to the entrance SNa of the nip portion SN was set to 6 mm.

The evaluation methods of the occurrence of void spots and the conveyance performance were the same as the methods described in the second embodiment. Table 5 illustrates an evaluation result.

TABLE 5

| | Void spots | Conveyance Performance |
|---|---|---|
| Comparative Example 3 | OK | Unacceptable |
| Comparative Example 4 | Unacceptable | OK |
| Third Embodiment | OK | OK |

According to Table 5, in Comparative Example 3, while the occurrence of void spots was evaluated as OK, conveyance performance was evaluated as unacceptable. The conveyance performance was evaluated as unacceptable because, although the electrostatic charge removal portion B was close to the conveyance path of the recording material S, the regulation portion A is too far from the nip portion SN. As a result, the leading end of the recording material S came into contact with the electrostatic charge removal portion B and the recording material S was partially folded. In Comparative Example 4, in contrast to Comparative Example 3, although the conveyance performance was evaluated as OK because the regulation portion A is close to the transfer nip SN, the occurrence of void spots was evaluated as unacceptable, which is caused by the electrostatic charge removal portion B positioned too far away from the transfer nip SN. In contrast to these, regarding the third embodiment, the electrostatic charge removal portion B is positioned close to the transfer nip SN so that void spots were evaluated as OK. Additionally the regulation portion A is positioned close to the transfer nip SN in the third embodiment so that the conveyance variability for the recording material S is controlled, resulting in sufficient conveyance performance.

As described above, also in the case of the configuration of the present embodiment, it is possible to prevent void spots without impairing paper conveyance performance under conditions prone to void spots.

The conveyance guide 32 of the present embodiment has a configuration in which only the electrostatic charge removal portion B is made thinner, but the present disclosure is not limited to this configuration. For example, the thickness of the electrostatic charge removal portion B may be maintained at the thickness of 1.0 mm. In this case, electric discharge between the electrostatic charge removal portion B and the secondary transfer roller 15 becomes slightly unstable, and a void spot prevention effect slightly drops as compared with the configuration of the present embodiment, but it is sufficient that the thickness may be selected depending on the specification. In the configuration of the present embodiment, while ensuring strength at the regulation portion A of the conveyance guide 32, it is possible to further prevent void spots by making electric discharge between the electrostatic charge removal portion B and the secondary transfer roller 15 stable. The electrostatic charge removal member is not limited to the electrostatic charge eliminator as long as the electrostatic charge removal member has a non-contact configuration, and an electrostatic charge removal brush or an electrostatic charge removal cloth is selectable as long as the charge of the surface of the transfer member can be removed.

In the second and third embodiments, the conveyance guide 32 is formed by molding an iron sheet metal, but the present disclosure is not limited to this configuration, and it is sufficient that the conveyance guide 32 has conductivity to release a transfer current.

For example, the conveyance guide 32 may be formed by molding a conductive resin.

Figure 14:
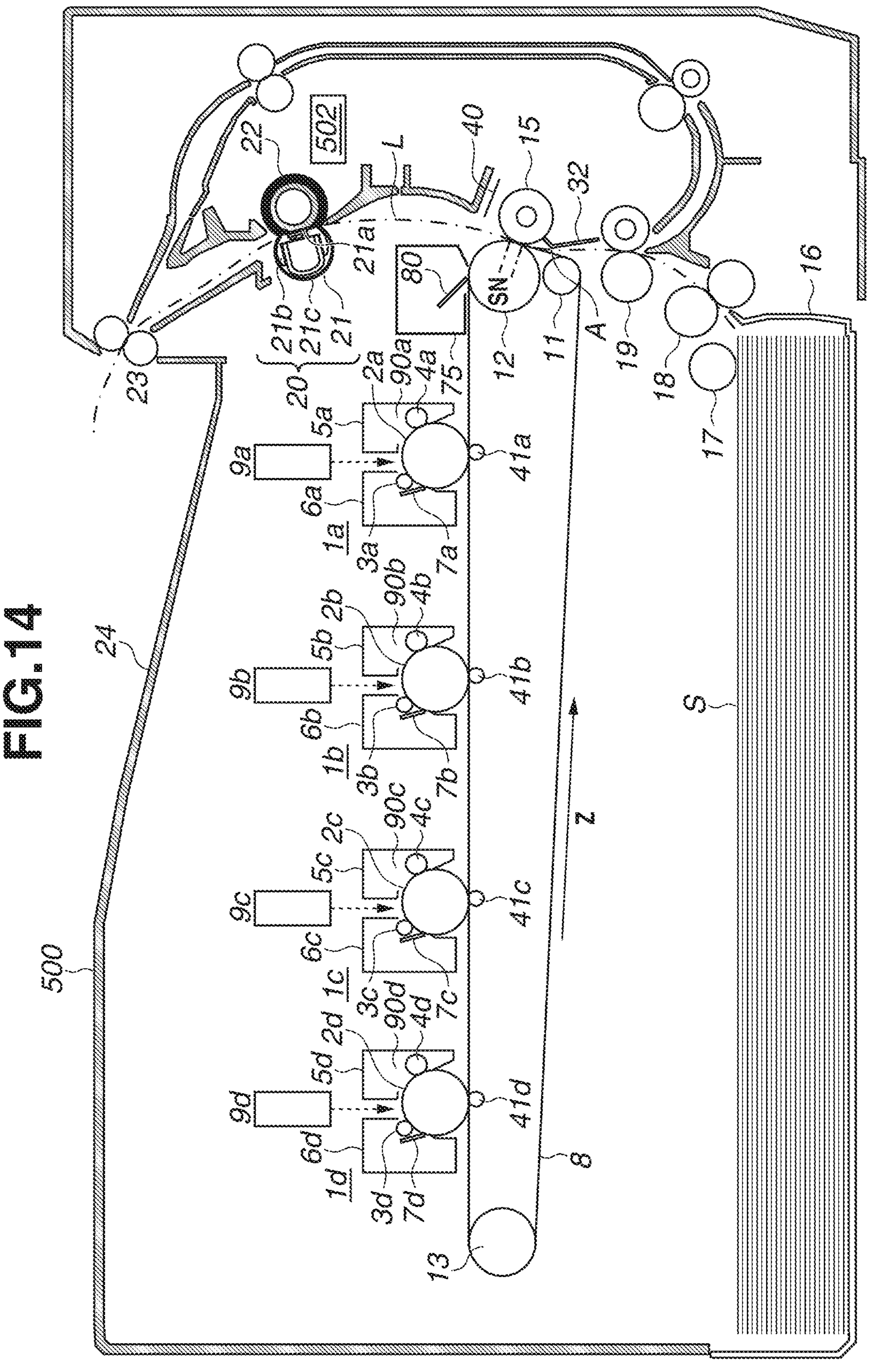
FIG. 14 is a diagram illustrating an image forming apparatus according to another embodiment.

The intermediate transfer belt 8 with the configuration of the present embodiment is stretched by the secondary transfer counter roller 12 also playing a role of driving of the intermediate transfer belt 8, and the tension roller 13, which serves as a stretching member. Alternatively, the present disclosure is applicable also to a configuration of stretching the intermediate transfer belt 8 with three shafts using a stretching roller 11 serving as an assist roller as illustrated in FIG. 14.

The effect of the present disclosure is not limited to an image forming apparatus that uses an intermediate transfer belt. For example, also in a configuration of directly transferring toner from a photosensitive drum to a recording material, such as a monochrome image forming apparatus, a similar effect is obtained.

Next, a fourth embodiment will be described. The components having functions and configurations that are the same as or equivalent to those in the first embodiment are assigned the same reference numerals, and the detailed description will be omitted.

<Image Formation Operation>

In the image formation operation of the present embodiment, if image formation starts, the photosensitive drum 2 and the intermediate transfer belt 8 start to rotate in the arrow direction by being driven by a drive unit 60 at a predetermined process speed (100 mm/sec in this example). Electric discharge occurs between the photosensitive drum 2 and the charging roller 3 to which a predetermined charging voltage (about −1000 V) is applied by the charging power source 71, and the photosensitive drum 2 is uniformly charged to a surface potential of about −450 V. The surface potential of about −450 V applied at the time will be referred to as a dark portion potential Vd.

Subsequently, an electrostatic latent image that is based on image data for output is formed by scanning beams from the exposure device 9. The surface potential of the photosensitive drum 2 that is applied when an electrostatic latent image of a solid image is formed is about −100 V. The surface potential of about −100 V applied at the time will be referred to as a bright portion potential Vl.

At this time, the electrostatic latent images of the respective colors are formed at predetermined timings of the respective colors in such a manner that images of the four colors are superimposed on the intermediate transfer belt 8 to create a full-color image. If the exposed photosensitive drums 2 further rotate, the electrostatic latent images on the photosensitive drums 2 are visualized (developed) by the development rollers 4 to which a development voltage of about −300 V is applied by the development power source 72. The development roller 4 rotates in a forward direction with respect to the rotational direction of the photosensitive drum 2. The Y, M, C, and Bk toner images are respectively formed on the photosensitive drums 2. If the toner images on the photosensitive drums 2 further rotate, the toner images are transferred onto the intermediate transfer belt 8 by the primary transfer rollers 41 to which a primary transfer voltage of about +800 V is applied by the primary transfer power source 73.

The transfer materials S stacked on the sheet feeding cassette 16 are fed by a sheet feeding roller 17 also serving as a semilunar pickup roller, and separated into one by a sheet feeding roller pair 18 also serving as a separation roller, conveyed up to the registration roller pair 19, and stopped. The stopped transfer material S is supplied by the registration roller pair 19 to the secondary transfer nip SN in synchronization with a timing at which the four-color toner image formed on the intermediate transfer belt 8 reaches the secondary transfer nip SN. The secondary transfer voltage is then applied by the secondary transfer power source 74, and the toner image on the intermediate transfer belt 8 is transferred onto the transfer material S.

The transfer material S bearing the transferred toner image is separated from the intermediate transfer belt 8 and fed to the fixing device 20. In the fixing device 20, the print surface of the transfer material S is heated by the heating member 21 and the non-print surface thereof is pressed by the pressure roller 22, so that the toner image is melted and fixed to the transfer material S. The discharge roller pair 23 is provided downstream of the fixing member 20 in the conveyance direction of the transfer material S, and discharges the transfer material S to the discharge tray 24 of the image forming apparatus 500. Transfer residual toner remaining on the surface of the intermediate transfer belt 8 is collected by the belt cleaning device 75 including the belt cleaning blade 80 serving as a belt cleaning member.

<Configuration of Secondary Transfer Portion>

In the present embodiment, the conveyance guide 32 including the regulation portion A serving as a guide portion and the contact electrode 29 serving as an electrostatic charge removal member including the electrostatic charge removal portion B are electrically connected, and are grounded via a current suppression circuit 610. Hereinafter, the details of the configuration of the conveyance guide 32 according to the present embodiment will be described with reference to FIG. 15.

The conveyance guide 32 is formed by molding an iron sheet metal with a thickness of 1.0 mm, and includes the regulation portion A protruding toward the secondary transfer counter roller 12. The contact electrode 29 is also formed by molding an iron sheet metal with a thickness of 1.0 mm, and is in contact with the secondary transfer roller 15 at the electrostatic charge removal portion B. The conveyance guide 32 and the contact electrode 29 are connected via a conductive path 61. In the present embodiment, a distance α from the regulation portion A to the entrance SNa of the nip portion SN is set to 5 mm. A shorter distance α enables more stable guidance of the leading end of the recording material S to the nip portion SN. A distance β from the electrostatic charge removal portion B to the entrance SN a of the nip portion SN is set to 5 mm. As the distance β is reduced, the surface potential of the secondary transfer roller 15 in the electric discharge region H decreases, thus increasing void spot prevention effect. The void spots are image defects caused by abnormal discharge occurring between the recording material S and the intermediate transfer belt 8 in the electric discharge region H formed just before the secondary transfer nip SN, resulting in the toner image in the abnormal discharge region not being transferred and thus missing.

The conveyance guide 32 is grounded via the current suppression circuit 610. Specifically, the conveyance guide 32 is connected with the current suppression circuit 610 via a conductive path 600*a*, and the current suppression circuit 610 is connected to the ground via a conductive path 600*b*. In this manner, the configuration in which the conveyance guide 32 and the contact electrode 29 are grounded via the same conductive path 600*a* instead of separate conductive paths can reduce the number of conductive paths for grounding, and enhance the flexibility of arrangement of the conductive path. This allows compact arrangement of the conveyance guide 32, the contact electrode 29, and a conductive path for grounding these, in a limited space provided immediately anterior to the secondary transfer nip SN, thus achieving the downsizing of the image forming apparatus.

Figure 15:
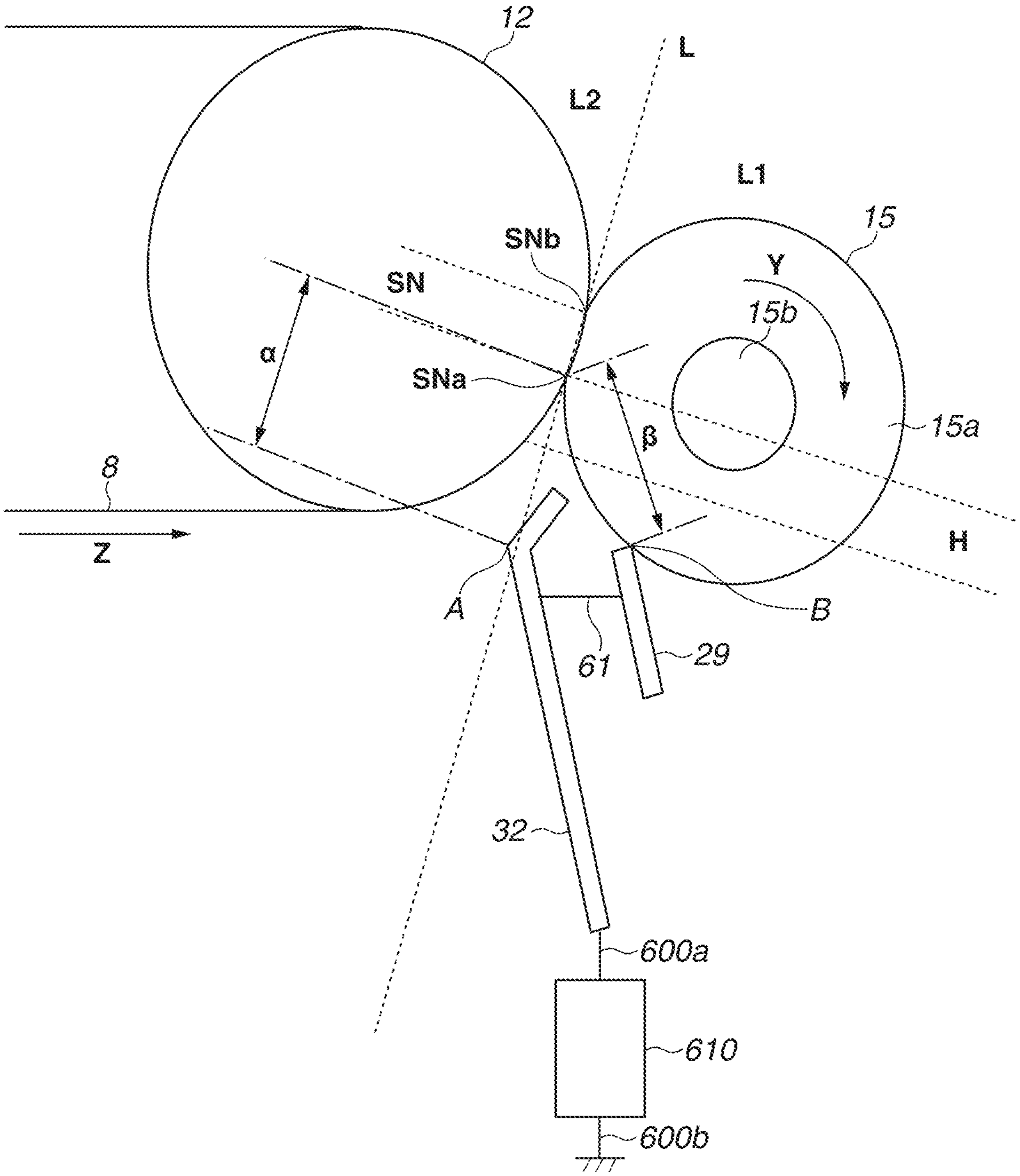
FIG. 15 is an enlarged view of a secondary transfer portion according to the fourth embodiment.

The electrostatic charge removal portion B is formed at the leading end of the conveyance guide 32. As illustrated in FIG. 15, the electrostatic charge removal portion B is arranged in the region L1 where the secondary transfer roller 15 is arranged, out of the regions L1 and L2 defined by the tangent line L of the secondary transfer roller 15 and the intermediate transfer belt 8.

In the present embodiment, the regulation portion A of the conveyance guide 32 is arranged in such a manner as to be located in the region L2 on an opposite side (the secondary transfer counter roller 12 side) of the secondary transfer roller 15 across a straight line L connecting the entrance SNa and an exit SNb of the transfer nip SN. By arranging the regulation portion A in this manner, the conveyance path of the recording material S that is regulated by the regulation portion A gets closer to the intermediate transfer belt 8 in the electric discharge region H which is an electric discharge region. Thus, a short distance between the recording material S and the intermediate transfer belt 8 in the electric discharge region H makes abnormal electrical discharges less likely to occur, thus further preventing void spots. A toner image print range in the recording material S of the image forming apparatus 500 of the present embodiment is a range up to 5 mm from the trailing edge of the recording material S, and a 5-mm region from the trailing edge of the recording material S is left blank. By setting the distance α to a distance equal to the length of the blank region or less as in the present embodiment, it is also possible to prevent the occurrence of void spots in the toner image in the proximity of the trailing edge of the recording material S.

Figure 16A:
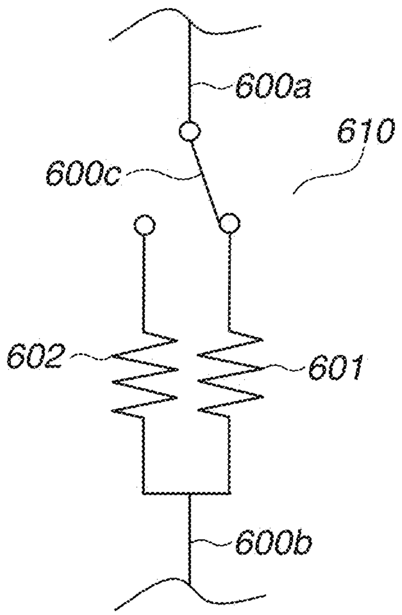
FIGS. 16A and 16B are schematic diagrams of current suppression circuits according to fourth and fifth embodiments.
Figure 16B:
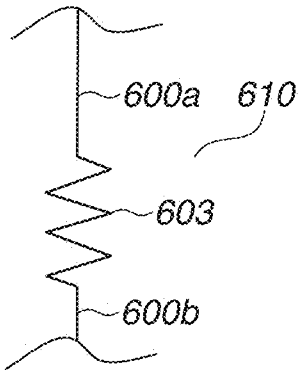

In the present embodiment, as in the configuration illustrated in FIG. 16B, a configuration of using a single medium resistive element 603 having a resistance between those of a high resistive element 602 and a low resistive element 601, which will be described in detail in a fifth embodiment in conjunction with FIG. 16A, is employed. By employing the configuration illustrated in FIG. 16B, it is possible to be adapted to both of a low-humidity environment and a high-humidity environment to some extent while contributing to the downsizing of the entire apparatus. In other words, under a condition where void spots and transfer voids are unlikely to occur, the image forming apparatus can be used without any issue. In the present embodiment, a resistance range of the medium resistive element 603 is desirably the range from 100 MΩ to 1 GΩ. The resistance of the medium resistive element 603 of the fourth embodiment is set to 600 MΩ.

<Evaluation Test>

To confirm the effect of the present embodiment, the occurrence of void spots and the occurrence of transfer voids were evaluated. The image forming apparatuses used for the evaluation included two types: one in the fourth embodiment illustrated in FIG. 16B and one in Comparative Example 5 as a conventional configuration. In the configuration of Comparative Example 5, the configurations of a conductive path for grounding the conveyance guide 32 and the contact electrode 29, and the current suppression circuit 610 are changed from those in the fourth embodiment.

Figure 17A:
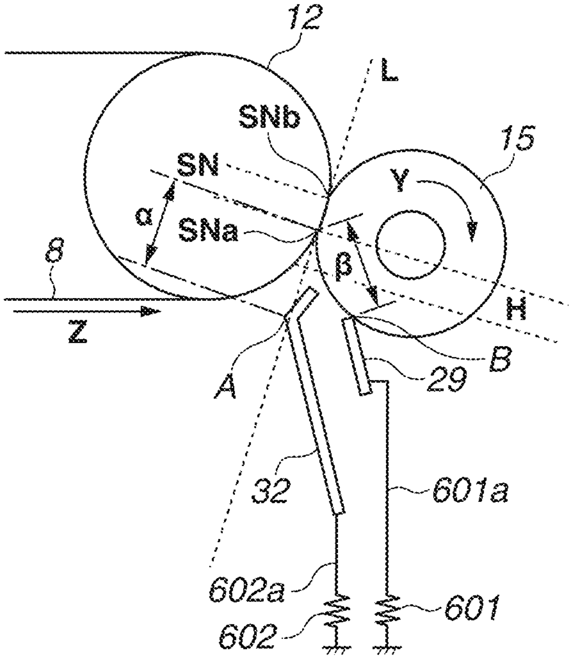
FIGS. 17A, 17B, and 17C are enlarged views of secondary transfer portions according to Comparative Example 5, Modified Example 1, and Modified Example 2.

Comparative Example 5 will be described with reference to FIG. 17A. In the image forming apparatus of Comparative Example 5, the conveyance guide 32 and the contact electrode 29 are grounded via separate conductive paths. Specifically, the conveyance guide 32 is grounded via the high resistive element 602 connected by a conductive path 602*a*, and the contact electrode 29 is grounded via the low resistive element 601 connected by a conductive path 601*a*. The resistance values of the high resistive element 602 and the low resistive element 601 are set to the same resistance values as those in the fourth embodiment. In this configuration, it is necessary to arrange the conductive path 601*a* while ensuring sufficient distances from the conveyance guide 32 and the conductive path 602*a*, in order to prevent electrical short circuit with the conveyance guide 32 and the conductive path 602*a*, and electric discharge. This results in the upsizing of the image forming apparatus, depending on the arrangement space of the conductive path 601*a*.

An evaluation method for the occurrence of void spots and transfer voids is as described below.

Void Spot Evaluation Method:

As the recording material S, a sheet with 75 g/m$^2$ (Vitality (Xerox corporation), LTR sheet size) in an unopened state was used, and whole-area black images were printed on ten sheets in an environment with a room temperature of 15° C. and a humidity of 10%. The voltage to be applied to the secondary transfer roller 15 was set to 3500 V, at which the toner transfer efficiency to the recording material S reaches its optimum level (a targeted transfer current flowing from the secondary transfer roller 15 to the recording material S is 10 μA). In a case where no visually-recognizable void spot is included in any of the printed toner images, the evaluation result was marked OK, and in a case where a visually-recognizable void spot is included in any of them, the evaluation result was marked unacceptable.

Transfer Void Evaluation Method:

As the recording material S, a sheet with 75 g/m$^2$ (Vitality (Xerox corporation), LTR sheet size) in an unopened state was used, and whole-area black images were printed on ten sheets in an environment with a room temperature of 30° C. and a humidity of 80%. The voltage to be applied to the secondary transfer roller 15 was set to 700 V, at which the toner transfer efficiency to the recording material S reaches its optimum level (a targeted transfer current flowing from the secondary transfer roller 15 to the recording material S is 10 μA). In a case where no visually-recognizable transfer void is included in any of the printed toner images, the evaluation result was marked OK, and in a case where a visually-recognizable transfer void is included in any of them, the evaluation result was marked unacceptable.

Table 6 illustrates the evaluation results and whether the configuration is suitable for downsizing. If the configuration is suitable for downsizing of an image forming apparatus, it is marked as OK; if it is not suitable for downsizing, it is marked as unsuitable.

Regarding Comparative Example 5, a value of current flowed to the low resistive element 601 at the time of secondary transfer in the void spot evaluation, and a value of current flowed to the high resistive element 602 at the time of secondary transfer in the transfer void evaluation were measured and described in parentheses. Regarding the fourth embodiment, a value of current flowed to the current suppression circuit 610 at the time of secondary transfer was measured and described in parentheses.

TABLE 6

| | Downsizing | Void spot | Transfer Void |
|---|---|---|---|
| Comparative Example 5 | Unsuitable | OK (14.1 μA) | OK (0.1 μA) |
| Fourth Embodiment | OK | OK (5.9 μA) | OK (0.1 μA) |

As illustrated in Table 6, in Comparative Example 5, both the occurrence of void spots and the occurrence of transfer voids were evaluated as OK. This is because the contact electrode 29 and the conveyance guide 32 are grounded via the respective appropriate resistors. Nevertheless, as described above, downsizing was evaluated as unsuitable.

In the fourth embodiment, both the conveyance guide 32 and the contact electrode 29 are grounded via the current suppression circuit 610. This enables downsizing while both evaluations on void spots and transfer voids are marked OK. This is because, in order to accommodate the transfer to high-resistance recording material S in a low-humidity environment, the resistance value of the current suppression circuit 610 is set to a medium resistance range, allowing some transfer current to escape from the electrostatic charge removal portion B. Additionally, to accommodate the transfer to low-resistance recording material S in a high-humidity environment, the resistance value of the current suppression circuit 610 is set to a medium resistance range, thereby reducing the outflow of transfer current through the conveyance guide 32 to some extent.

The configuration of the fourth embodiment has the following features.

The image forming apparatus includes the intermediate transfer belt 8, and the rotatable secondary transfer roller 15 configured to be brought into contact with the surface of the intermediate transfer belt 8 to form the secondary transfer nip portion SN, and transfer the toner 90 supplied to the surface of the intermediate transfer belt 8, to the recording material S at the secondary transfer nip portion SN. The image forming apparatus includes the contact electrode 29 that removes the electrostatic charge from the surface of the secondary transfer roller 15 at the counter portion facing the surface of the secondary transfer roller 15 at the upstream of the secondary transfer nip portion SN both in the rotational direction of the secondary transfer roller 15 and in the moving direction of the recording material S. The image forming apparatus includes the conveyance guide 32 that guides the conveyance of the recording material S to the secondary transfer nip portion SN by being brought into contact with an opposite surface to the surface of the recording material S to which the toner 90 is to be transferred. The image forming apparatus includes the secondary transfer voltage application unit 74 that applies a transfer voltage to the secondary transfer roller 15. The conveyance guide 32 and the contact electrode 29 are grounded via the medium resistive element 603 serving as the same current suppression circuit 610, and the contact electrode 29 removes the electrostatic charge of the surface of the secondary transfer roller 15 at the counter portion in a state in which the transfer voltage is applied to the secondary transfer roller 15. The contact electrode 29 gets into contact with the secondary transfer roller 15 at the counter portion B-B'. The image forming apparatus includes the secondary transfer counter roller 12 that has contact with the inner surface of the intermediate transfer belt 8 and faces the secondary transfer roller 15, and the transfer nip portion SN is formed by the intermediate transfer belt 8, the secondary transfer roller 15, and the secondary transfer counter roller 12.

The polarity of the transfer voltage is opposite to the normal polarity of the toner 90. In the cross section orthogonal to the rotational axis of the secondary transfer roller 15, the contact electrode 29 is arranged in the region L1 where the secondary transfer roller 15 is arranged, out of the regions L1 and L2 divided by a tangent line of the secondary transfer roller 15 and the intermediate transfer belt 8. The transfer voltage is set to a voltage at which electric discharge with the contact electrode 29 occurs. The contact electrode 29 forms the counter portion B-B' at the upstream in the rotational direction of the secondary transfer roller 15 of the region H where electric discharge occurs between the secondary transfer roller 15 and the intermediate transfer belt 8.

As described above, in the case of the configuration of the present embodiment, it is possible to achieve both a void spot prevention effect and a transfer void prevention effect while downsizing the image forming apparatus.

Subsequently, the fifth embodiment will be described. In the configuration of the fifth embodiment, both the conveyance guide 32 and the contact electrode 29 are grounded via the current suppression circuit 610 which is a component different from that in the fourth embodiment, and a configuration of releasing a transfer current from the secondary transfer roller 15 to the electrostatic charge removal portion B by electric discharge is employed. For this reason, as compared with the configuration of the fourth embodiment, it becomes possible to prevent an image defect attributed to transfer, even under an environment prone to void spots and/or transfer voids, while ensuring downsizing. The configurations other than the above-described configuration are the same as those in the fourth embodiment. Accordingly, the components having functions and configurations that are the same as or equivalent to those in the fourth embodiment are assigned the same reference numerals, and the detailed description will be omitted.

<Configuration of Secondary Transfer Portion>

As illustrated in FIG. 16A, the current suppression circuit 610 of the present embodiment is configured such that the resistance between the ground and the current suppression circuit 610 can be switched between low resistive element 601 and the high resistive element 602 by a relay switch 600*c* controllable by the control unit 502. In the present embodiment, the control unit 502 reads a detection result of a temperature and humidity sensor 36 serving as an environmental sensor. If the humidity is 50% or higher, it is determined to be a high-humidity environment; if the humidity is less than 50%, it is determined to be a low-humidity environment, and the relay switch 600*c* is switched accordingly. The temperature and humidity sensor 36, serving as an environmental sensor, may also be a humidity sensor that detects only humidity.

In the low-humidity environment, the recording material S dries out, increasing its electrical resistance. As a result, a higher transfer voltage is to be applied to the secondary transfer roller 15 to transfer the toner to the recording material S, making void spots more likely to occur. Thus, in the low-humidity environment, the relay switch 600*c* of the current suppression circuit 610 is switched to the low resistive element 601 with low resistance, so that the transfer current is partially easily released from the surface of the secondary transfer roller 15 to the ground via the electrostatic charge removal portion B. This locally reduces the surface potential of the secondary transfer roller 15 in the proximity of the electrostatic charge removal portion B (electrostatic charge removed), and an electric field of the electric discharge region H also decreases, preventing the occurrence of abnormal electrical discharge between the transfer material S and the intermediate transfer belt 8 in the electric discharge region H. This prevents or reduces the occurrence of void spots. The resistance value of the low resistive element 601 is to be a value that ensures an adequate current flow from the electrostatic charge removal portion B to the ground to prevent or reduce void spots. A value between 0Ω to 300 MΩ is desirable. In the present embodiment, the resistance value of the low resistive element 601 is set to 100 MΩ.

Since the recording material S absorbs moisture and its electric resistance decreases in the high-humidity environment, the transfer current leaks through the recording material S, making transfer voids more likely to occur. Thus, by switching the relay switch 600*c* of the current suppression circuit 610 to the high resistive element 602 with high resistance in the high-humidity environment, current is made difficult to flow from the electrostatic charge removal portion B to the ground. With this configuration, even in a case where the recording material S absorbs moisture and its electric resistance decreases, it is possible to prevent a transfer current from leaking through the recording material S and the regulation portion A. Regarding void spots, since a transfer voltage in transferring toner to the recording material S with low electric resistance decreases, a void spots are unlikely to occur even if a current is difficult to flow from the electrostatic charge removal portion B to the ground. The resistance value of the high resistive element 602 is to be set to a value at which an amount of current flowing from the regulation portion A to the ground can be restricted to a current amount that can prevent a transfer void attributed to the outflow of the transfer current, and is desirably about 400 MΩ to 5 GΩ. In the present embodiment, the resistance value of the high resistive element 602 is set to 1 GΩ.

<Evaluation Test>

To confirm the effect of the present embodiment, the occurrence of void spots and the occurrence of transfer voids were evaluated. The image forming apparatuses used for the evaluation included three types: one in the fifth embodiment and those in Modified Examples 1 and 2 as conventional configurations. The configuration of the fourth embodiment is also described as a reference. In the configurations of Modified Examples 1 and 2, the configurations of a conductive path for grounding the conveyance guide 32 and the contact electrode 29, and the current suppression circuit 610 are changed from that in the fifth embodiment.

Figure 17B:
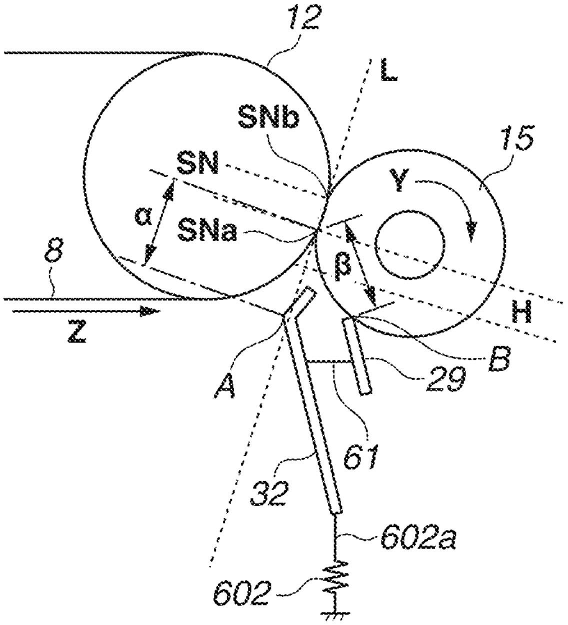
Figure 17C:
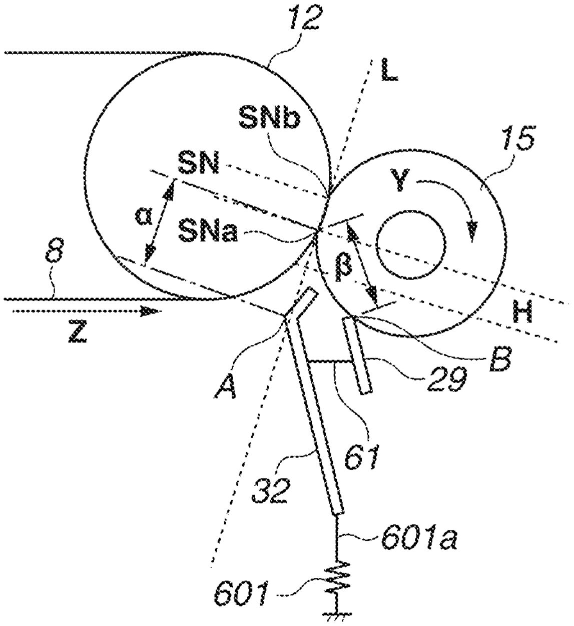

Modified Examples 1 and 2 will be described with reference to FIGS. 17B and 17C, respectively. In an image forming apparatus of Modified Example 1, the conveyance guide 32 and the contact electrode 29 are connected via the conductive path 61, and the conveyance guide 32 is grounded via the high resistive element 602 connected by the conductive path 602*a*. In this configuration, as in the fourth embodiment, the conveyance guide 32 and the contact electrode 29 are grounded via the same conductive path 602*a*. Additionally, as in the fourth and fifth embodiments, the configuration is suitable for the downsizing of the image forming apparatus. In an image forming apparatus of Modified Example 2, the conveyance guide 32 and the contact electrode 29 are connected via the conductive path 61, and the conveyance guide 32 is grounded via the low resistive element 601 connected by the conductive path 601*a*.

Also in this configuration, as in the fourth embodiment, the conveyance guide 32 and the contact electrode 29 are grounded via the same conductive path 601*a*, and as in Modified Example 1, the configuration is suitable for the downsizing of the image forming apparatus. Accordingly, Modified Examples 1 and 2 were merely evaluated by comparison with the fifth embodiment under the following condition, and there is no issue in use as long as the above-described condition is similar to that in the fourth embodiment.

An evaluation method for the occurrence of void spots and transfer void is as described below. The evaluation was conducted under a condition where an image defect more easily occurs than in the evaluation conducted for the fourth embodiment and Comparative Example 5.

Void Spot Evaluation Method:

The recording material S used was a sheet with 75 g/m$^2$ (Vitality (Xerox corporation), LTR sheet size)). This sheet was left in an environment with a room temperature of 15° C. and a humidity of 10% for a week to dry. The sheet, which had a water content ratio of 2.9% (measured by paper moisture meter Moistrex MX 8000), was prone to void spots. In the above-described environment, whole-area black images were printed on ten sheets.

The voltage to be applied to the secondary transfer roller 15 was set to 4000 V at which the toner transfer efficiency to the recording material S reaches its optimum level (a targeted transfer current flowing from the secondary transfer roller 15 to the recording material S is 10 μA).

In a case where no visually-recognizable void spot was included in any of the printed toner images, the evaluation result was marked OK, and in a case where a visually-recognizable void spot was included in any of them, the evaluation result was marked unacceptable.

Transfer Void Evaluation Method:

The recording material S used was a sheet with 75 g/m$^2$ (Vitality (Xerox corporation), LTR sheet size)). This sheet was left in an environment with a room temperature of 30° C. and a humidity of 80% for a week to absorb moisture. The sheet, which had a water content ratio of 9.2% (measured by paper moisture meter Moistrex MX 8000), was prone to transfer voids. In the above-described environment, whole-area black images were printed on ten sheets. The voltage to be applied to the secondary transfer roller 15 was set to 500 V, at which the toner transfer efficiency to the recording material S reaches its optimum level (a targeted transfer current flowing from the secondary transfer roller 15 to the recording material S is 10 μA). In a case where no visually-recognizable transfer void is included in any of the printed toner images, the evaluation result was marked OK, and in a case where a visually-recognizable transfer void is included in any of them, the evaluation result was marked unacceptable.

Table 7 illustrates the evaluation results and whether the configuration is suitable for downsizing. If the configuration is suitable for downsizing of an image forming apparatus, it is marked as OK; if it is not suitable for downsizing, it is marked as unacceptable.

Regarding Modified Example 1, values of currents flowed to the high resistive element 602 at the time of secondary transfer in the void spot evaluation and transfer void evaluation are described in parentheses. Regarding Modified Example 2, values of currents flowed to the low resistive element 601 at the time of secondary transfer in the void spot evaluation and transfer void evaluation were measured and are described in parentheses. Regarding the fourth and fifth embodiments, a value of current flowed to the current suppression circuit 610 at the time of secondary transfer was measured and described in parentheses.

TABLE 7

| | Downsizing | Void spots | Transfer Void |
|---|---|---|---|
| Modified Example 1 | OK | Unacceptable (4.2 μA) | OK (0.4 μA) |
| Modified Example 2 | OK | OK (15.0 μA) | Unacceptable (8.0 μA) |
| Fourth Embodiment | OK | OK (6.4 μA) | OK (3.9 μA) |
| Fifth Embodiment | OK | OK (15.0 μA) | OK (0.4 μA) |

As illustrated in Table 7, in Modified Example 1, the occurrence of void spots was evaluated as unacceptable. This is because the contact electrode 29 was grounded via the high resistive element 602, and the current flowing from the contact electrode 29 to the ground was insufficient for void spot prevention.

In Modified Example 2, the occurrence of transfer voids was evaluated as unacceptable. This is because the conveyance guide 32 was grounded via the low resistive element 601, and the amount of the transfer current flowing from the conveyance guide 32 to the ground through the recording material S increased. That is, in a case where the conveyance guide 32 and the contact electrode 29 are grounded via the same resistive element, downsize of the image forming apparatus is possible. Nevertheless, it is sometimes unable to achieve both the void spot prevention effect and the transfer void prevention effect depending on the condition. Accordingly, in using Modified Example 1 or Modified Example 2, it may be necessary to design with consideration of the above-mentioned case.

In contrast, for the fourth embodiment, the conditions changed to ones where void spots and transfer voids were more likely to occur, resulting in a slight degradation in both phenomena. However, the image quality was within an acceptable range.

Regarding the fifth embodiment, both the conveyance guide 32 and the contact electrode 29 are grounded via the current suppression circuit 610, levels of both void spot prevention effect and transfer void prevention effect further improved as compared with the fourth embodiment while enabling downsizing. When toner is transferred to a high-resistance recording material S in a low-humidity environment, by decreasing a resistance value of the current suppression circuit 610, a transfer current is sufficiently released from the electrostatic charge removal portion B. When toner is transferred to a low-resistance recording material S in a high-humidity environment, by increasing a resistance value of the current suppression circuit 610, it is possible to prevent a transfer current from leaking through the conveyance guide 32. Thus, both environments are handled in the fifth embodiment, it is possible to further achieve both the void spot prevention effect and the transfer void prevention effect.

The configuration of the fifth embodiment has the following features.

The image forming apparatus includes the environmental sensor 36 serving as a humidity detection unit that detects information regarding humidity, and the control unit 502 that controls the current suppression circuit 610 based on a detection result of the environmental sensor 36. The current suppression circuit 610 is a variable resistance circuit, and the control unit 502 controls a resistance value of the variable resistance circuit based on the detection result in such a manner that a resistor between the current suppression circuit 610 and the ground is switched between the low resistive element 601 and the high resistive element 602 by the relay switch 600*c*. A current amount of the current suppression circuit 610 is suppressed more in the case of transferring a toner image on the intermediate transfer belt 8 to a second recording material S with resistance lower than that of a first recording material S, than in the case of transferring a toner image on the intermediate transfer belt 8 to the first recording material S.

As described above, in the case of the configuration of the present embodiment, it is possible to further achieve both void spot prevention effect and transfer void prevention effect while downsizing the image forming apparatus.

The configuration of an image forming apparatus to which a sixth embodiment is applied is the same as that of the fifth embodiment except that the electrostatic charge removal portion B is not in contact with the secondary transfer roller 15, and a configuration of releasing a transfer current from the secondary transfer roller 15 to the electrostatic charge removal portion B by electric discharge is employed. Accordingly, the components having functions and configurations that are the same as or equivalent to those in the fifth embodiment are assigned the same reference numerals, and the detailed description will be omitted.

Figure 18A:
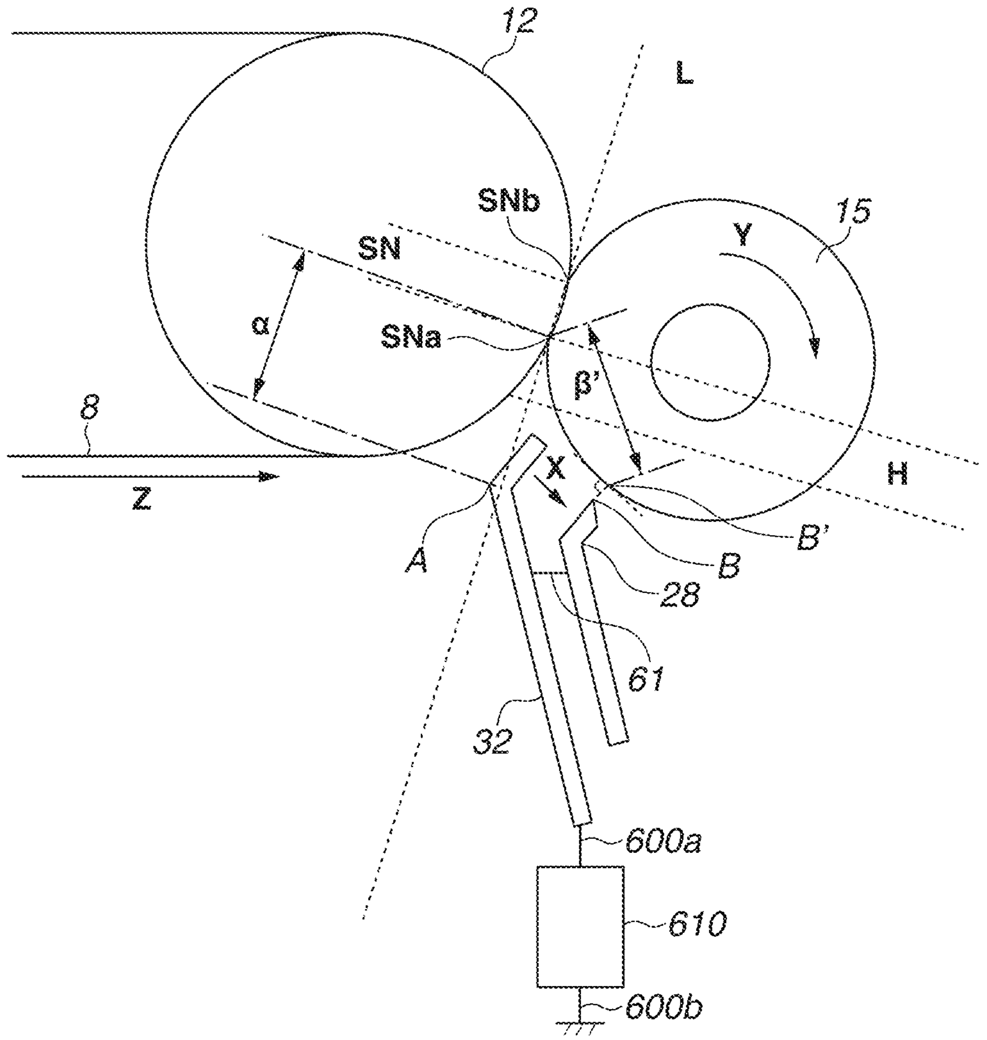
FIGS. 18A and 18B are an enlarged view of a secondary transfer portion and a schematic diagram of an electrostatic charge removal member according to a sixth exemplary embodiment.
Figure 18B:
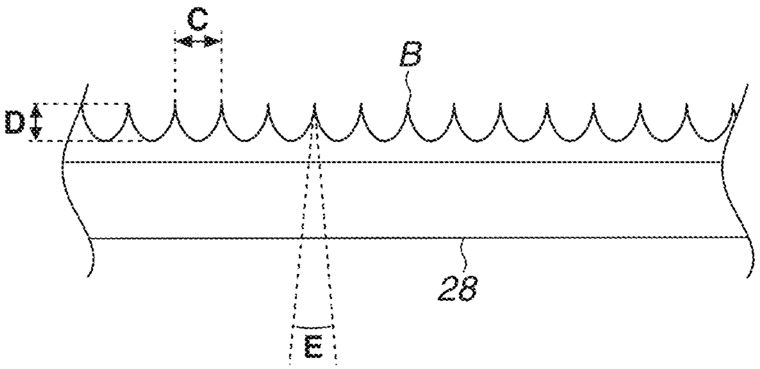

FIG. 18A is an enlarged view illustrating a secondary transfer portion formed by the intermediate transfer belt 8 and the secondary transfer roller 15 according to the present embodiment and the proximity thereof, and FIG. 18B is a schematic diagram illustrating the non-contact electrode 28 according to the present embodiment that is viewed from the arrow X direction illustrated in FIG. 18A.

In the present embodiment, as an electrostatic charge removal member of the fifth embodiment, the non-contact electrode 28 is arranged in place of the contact electrode 29. The non-contact electrode 28 is formed by molding an iron sheet metal with a thickness of 1.0 mm. As illustrated in FIG. 18B, an end of the non-contact electrode 28 facing the secondary transfer roller 15 is an electrostatic charge eliminator processed into a serrated shape as the electrostatic charge removal portion B, and a pitch C of adjacent serrations is set to 3.5 mm, a length D of the respective serrations is set to 2 mm, and a leading end angle E of the respective serrations is set to 18.9°. Polishing processing is performed in such a manner that the leading end of the electrostatic charge removal portion B has a thickness of 0.1 mm. The pitch C of each serration is desirably in the range from about 0.5 mm to 8.0 mm because, if the pitch C is too wide, a location from which charge is not removed occurs, and if the pitch C is too narrow, the effect of leading end electric discharge is attenuated.

The leading end of the electrostatic charge eliminator serving as the electrostatic charge removal portion B is arranged in such a manner that an electrostatic charge eliminator leading end is directed toward the secondary transfer roller 15 in a state of being in noncontact with the secondary transfer roller 15 across a clearance gap of 1 mm.

The electrostatic charge removal portion B forms the counter portion B-B' at the upstream in the rotational direction of the secondary transfer roller 15 of the region H where electric discharge occurs between the secondary transfer roller 15 and the intermediate transfer belt 8. The non-contact electrode 28 is connected with the conveyance guide 32 via the conductive path 61, and the non-contact electrode 28 and the conveyance guide 32 are grounded via the current suppression circuit 610 connected by the same conductive path 600*a*. Such a configuration concentrates ion current on the electrostatic charge eliminator leading end of the electrostatic charge removal portion B during application of a secondary transfer voltage, the corona discharge occurs between the electrostatic charge removal portion B and an electrostatic charge removal position B', which decreases the surface potential of the secondary transfer roller 15. Thus, the occurrence of void spots is prevented. The electrostatic charge removal position B' is a position on the surface of the secondary transfer roller 15 where the secondary transfer roller 15 is closest to the electrostatic charge removal portion B, and as illustrated in FIG. 18A, a straight line B-B' becomes vertical to the tangent line of the surface of the secondary transfer roller 15. The greater the amount of current generated by the corona discharge, the lower the potential at the electrostatic charge removal position B', and the greater the void spot prevention effect. Thus, a distance between the electrostatic charge removal portion B and the electrostatic charge removal position B' is to be set shorter than a corona discharge start distance between the electrostatic charge removal portion B and the electrostatic charge removal position B'. To obtain a sufficient void spot prevention effect, an amount of current flowing between the electrostatic charge removal portion B and the electrostatic charge removal position B' due to the corona discharge is desirably equal to or larger than a transfer current flowing through the transfer nip SN.

In this manner, a configuration in which the conveyance guide 32 and the non-contact electrode 28 are grounded via the same conductive path 600*a* instead of separate conductive paths can reduce the number of conductive paths for grounding, and enhance the flexibility of arrangement of the conductive path. This allows compact arrangement of the conveyance guide 32, the non-contact electrode 28, and a conductive path for grounding these, in a limited space provided immediately anterior to the secondary transfer nip SN, thus achieving the downsizing of the image forming apparatus.

The use of a non-contact electrostatic charge removal member, like an electrostatic charge eliminator, as the electrostatic charge removal portion B as in the present embodiment, a transfer current is released to the electrostatic charge removal portion B without bringing the electrostatic charge removal portion B into contact with the secondary transfer roller 15, which is more advantageous from the aspect of durability of the secondary transfer roller 15 as compared with the configuration of the fourth embodiment. Nevertheless, in the configuration of the present embodiment, a gap is to be provided between the electrostatic charge removal portion B and the secondary transfer roller 15, which may decrease the flexibility of design. Thus, it is sufficient that contact or non-contact of the electrostatic charge removal portion B is selected in accordance with characteristics demanded for the image forming apparatus.

<Evaluation Test>

To confirm the effect of the present embodiment, the evaluation of the occurrence of void spots and transfer void was conducted. The evaluation methods for the occurrence of void spots and transfer void were the same as the methods described in the fifth embodiment.

Table 8 indicates the evaluation results and whether the configuration is suitable for downsizing.

If the configuration is suitable for downsizing of an image forming apparatus, it is marked as OK; if it is not suitable for downsizing, it is marked as unacceptable. The value of current flowed to the current suppression circuit 610 at the time of secondary transfer was measured and described in parentheses.

TABLE 8

| | Downsizing | Void spots | Transfer Void |
|---|---|---|---|
| Sixth Embodiment | OK | OK (14.0 μA) | OK (0.4 μA) |

According to Table 8, in the sixth embodiment, both the conveyance guide 32 and the non-contact electrode 28 are grounded via the current suppression circuit 610. This enables downsizing while both evaluations on void spots and transfer voids are marked OK. This is because, in the transfer to high-resistance recording material S in a low-humidity environment, the resistance value of the current suppression circuit 610 is reduced to allow transfer current to sufficiently escape from the electrostatic charge removal portion B. Additionally, in the transfer to a low-resistance recording material S in a high-humidity environment, the resistance value of the current suppression circuit 610 is increased, thereby reducing the outflow of transfer current through the conveyance guide 32. The present embodiment is advantageous also for downsizing as described above.

As described above, in the case of the configuration of the present embodiment, also in the configuration that uses the non-contact electrode 28 in the secondary transfer roller 15, it is possible to achieve both the void spot prevention effect and the transfer void prevention effect while downsizing the image forming apparatus.

The non-contact electrode 28 of the present embodiment has a configuration in which only the proximity of the electrostatic charge removal portion B has a reduced thickness, but the present disclosure is not limited to this configuration. For example, the thickness of the electrostatic charge removal portion B may be maintained at the thickness of 1.0 mm. In this case, electric discharge between the electrostatic charge removal portion B and the secondary transfer roller 15 is unstable, and the void spot prevention effect slightly degrades as compared with the configuration of the present embodiment. The electrostatic charge removal member is not limited to the electrostatic charge eliminator as long as the electrostatic charge removal member has a non-contact configuration, and an electrostatic charge removal brush or an electrostatic charge removal cloth is selectable as long as electrostatic charge can be removed from the surface of the secondary transfer roller 15.

The configuration of an image forming apparatus to which a seventh embodiment is applied is the same as that of the sixth embodiment except for the configuration of the current suppression circuit 610, the components having functions and configurations that are the same as or equivalent to those in the sixth embodiment are assigned the same reference numerals, and the detailed description will be omitted.

Figure 19A:
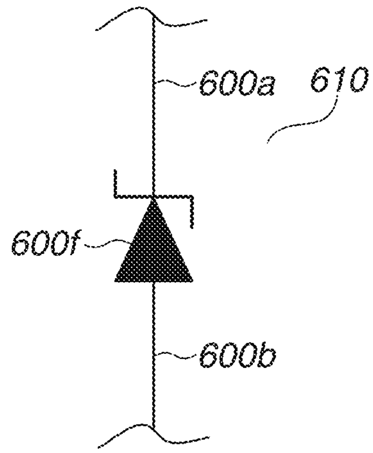
FIGS. 19A to 19E are schematic diagrams of a current suppression circuit according to a seventh embodiment.

FIGS. 19A to 19E are each a diagram illustrating the current suppression circuit 610 according to the present embodiment. The current suppression circuit 610 of the present embodiment is grounded via a Zener diode **600*f* serving as a constant-voltage element as illustrated in FIG. 19A. The Zener diode 600*f* is an element that maintains a predetermined voltage (hereinafter, will be referred to as a breakdown voltage) by current flowing. According to the configuration of the present embodiment, one end (anode side) of the Zener diode 600*f* is grounded, and a plus end (cathode side) is connected to the conveyance guide 32 via the conductive path 600*a*. Accordingly, when a current equal to or greater than a certain level flows through the Zener diode 600*f*, the voltage of the conveyance guide 32 is maintained at the breakdown voltage of the Zener diode 600*f***.

The breakdown voltage of the Zener diode **600*f* is desirably set to about the same level as a transfer voltage to be applied to the secondary transfer roller 15 under a condition prone to transfer voids (for example, when toner is secondarily transferred to a low-resistance recording material S). By setting the breakdown voltage in this manner, when toner is secondarily transferred to a low-resistance recording material S, it is possible to maintain the potential of the conveyance guide 32 at the same potential as the transfer voltage. It is possible to prevent a transfer current from being released from the secondary transfer roller 15 to the conveyance guide 32 through the recording material S, which cause transfer voids. If the breakdown voltage of the Zener diode 600*f* is too small, a transfer current starts to leak to the conveyance guide 32 through the recording material S, resulting in the occurrence of transfer voids. On the other hand, in contrast, if the breakdown voltage of the Zener diode 600*f* is too large, current flows from the conveyance guide 32 to the transfer nip SN through the recording material S, decreasing the transfer efficiency. For this reason, the breakdown voltage of the Zener diode 600*f* is desirably set to ±100 V of a transfer voltage under condition prone to transfer voids. In the present embodiment, the breakdown voltage of the Zener diode 600*f*** is set to 500 V.

Also in the configuration of the present embodiment, under conditions prone to void spots, it becomes possible to flow sufficient current to the current suppression circuit 610 to prevent void spots. Also in secondary transfer to a high-resistance recording material S prone to void spots, the potential of the conveyance guide 32 is maintained at 500 V. For this reason, the potential of the electrostatic charge removal portion B of the non-contact electrode 28 connected to the conveyance guide 32 via the conductive path 61 is also maintained at 500 V. In secondary transfer to a high-resistance recording material S prone to void spots, a transfer voltage larger than the potential of the non-contact electrode 28 is applied to the secondary transfer roller 15. Thus, the electrostatic charge removal portion B can decrease the surface potential of the secondary transfer roller 15.

In this manner, in the configuration of the present embodiment, while the components such as the temperature and humidity sensor 36 and the relay switch **600*c*** as in the fourth, fifth, and sixth embodiments are not required, both void spot prevention and transfer void prevention can be achieved while the image forming apparatus can be downsized with a low-cost simple configuration.

<Evaluation Test>

To confirm the effect of the present embodiment, the evaluation of the occurrence of void spots and transfer voids was conducted. The evaluation methods for the occurrence of void spots and transfer voids were the same as the methods described in the sixth embodiment.

Table 9 shows the evaluation results and whether the configuration is suitable for downsizing. In a case where the configuration is suitable for the downsizing of the image forming apparatus, the downsizing was marked OK, and in a case where the configuration is unsuitable for the downsizing of the image forming apparatus, the downsizing was marked unacceptable. The values of current flowed to the current suppression circuit 610 at the time of secondary transfer was measured and described in parentheses.

TABLE 9

| | Downsizing | Void spots | Transfer Void |
|---|---|---|---|
| Seventh Embodiment | OK | OK (13.0 μA) | OK (0.0 μA) |

According to Table 9, in the seventh embodiment, both the conveyance guide 32 and the non-contact electrode 28 are grounded via the current suppression circuit 610 including a constant-voltage element as in the sixth embodiment, so that both of the evaluations for void spots and transfer void were marked OK while downsizing is enabled. This is because a transfer current is sufficiently released from the electrostatic charge removal portion B by the current suppression circuit 610 in transfer to a high-resistance recording material S, and a transfer current can be prevented from leaking via the conveyance guide 32, by the current suppression circuit 610 in transferring to a low-resistance recording material S.

As described above, in the case of the configuration of the present embodiment, both the void spot prevention effect and the transfer void prevention effect are achieved while the image forming apparatus is downsized.

Also in a case where the contact electrode 29 as in the fourth embodiment is used in place of the non-contact electrode 28 of the present embodiment, by using the current suppression circuit 610 including a constant-voltage element as in the present embodiment, it is possible to downsize the image forming apparatus. Furthermore, it is possible to achieve both the void spot prevention effect and the transfer void prevention effect.

Figure 19B:
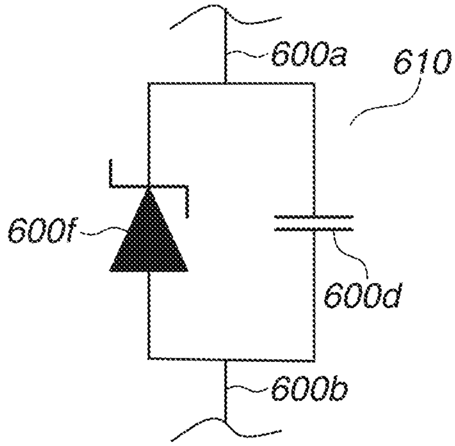
Figure 19C:
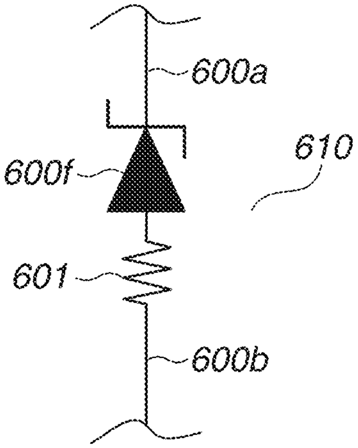
Figure 19D:
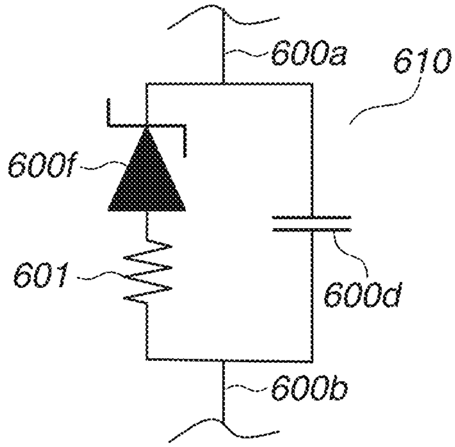
Figure 19E:
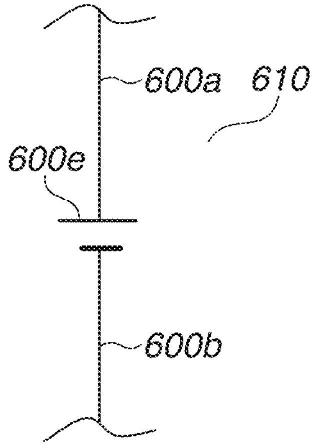

The configuration of the current suppression circuit 610 in the present disclosure is not limited to a configuration that uses a constant-voltage element alone as in the present embodiment, and may be any configuration as long as the potential of the conductive path 600*a* can be made approximately the same as a transfer voltage under conditions prone to transfer voids. For example, a capacitor 600*d* as illustrated in FIG. 19B may be arranged in parallel with the constant-voltage element. In this configuration, in a case where high-frequency noise inflows through the recording material S, it is possible to reduce a voltage variation attributed to the noise, by the capacitor 600*d*. For example, the low resistive element 601 may be arrange in series with the constant-voltage element as illustrated in FIG. 19C. In this configuration, it is possible to appropriately adjust an amount by which a transfer current is released from the electrostatic charge removal portion B. As illustrated in FIG. 19D, a configuration obtained by combining the configurations in FIGS. 19B and 19C may be employed. In the present embodiment, the Zener diode 600*f* is used as a constant-voltage element, but an avalanche diode or a varistor may be used as an element that can obtain an effect similar to that of the Zener diode 600*f*. As illustrated in FIG. 19E, voltage may be directly applied to the conductive path 600*a* by replacing the constant-voltage element with a high-voltage power source 600*e*.

In the fourth to seventh embodiments, the conveyance guide 32, the contact electrode 29, and the non-contact electrode 28 have a configuration obtained by molding an iron sheet metal, but the present disclosure is not limited to this configuration, and these are only required to have conductivity.

For example, the conveyance guide 32, the contact electrode 29, and the non-contact electrode 28 may be formed by molding a conductive resin.

Figure 20A:
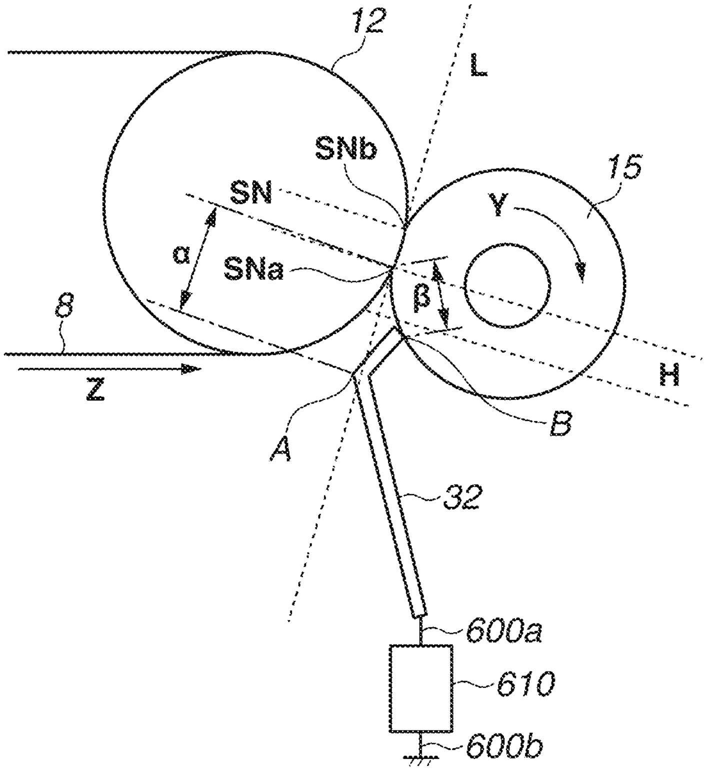
FIGS. 20A and 20B are schematic diagrams of a conveyance guide according to another exemplary embodiment.
Figure 20B:
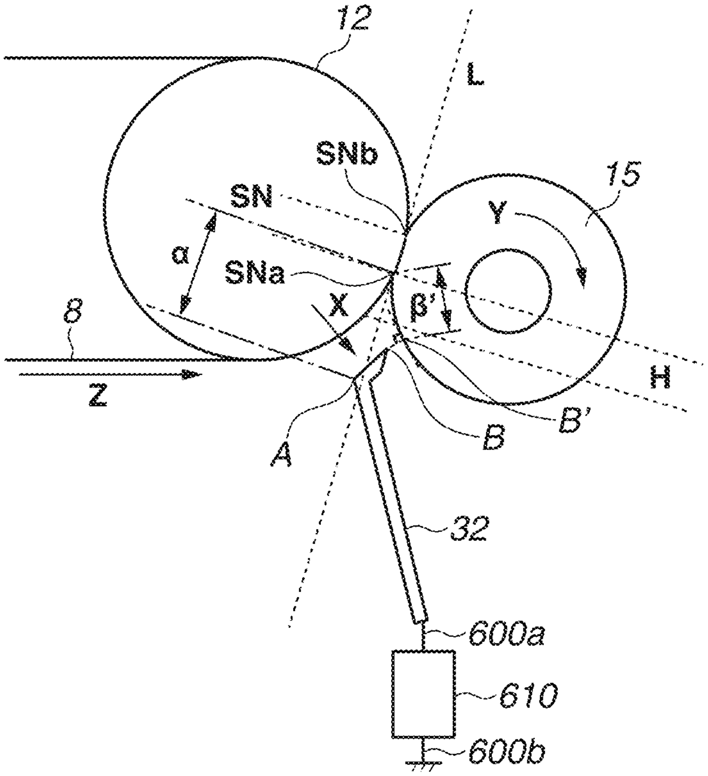

In the fourth to seventh embodiments, the contact electrode 29 or the non-contact electrode 28 includes the electrostatic charge removal portion B, but the conveyance guide 32 may include the electrostatic charge removal portion B. For example, as illustrate in FIG. 20A, a configuration in which the conveyance guide 32 includes the electrostatic charge removal portion B that removes the electrostatic charge of the surface of the secondary transfer roller 15 by getting into contact with the secondary transfer roller 15, and the conveyance guide 32 is grounded via the current suppression circuit 610 may be employed. As illustrate in FIG. 20B, a configuration in which the conveyance guide 32 includes the electrostatic charge removal portion B that removes the electrostatic charge of the surface of the secondary transfer roller 15 without getting into contact with the secondary transfer roller 15, and the conveyance guide 32 is grounded via the current suppression circuit 610 may be employed. In these configurations, the contact electrode 29, the non-contact electrode 28, and the conductive path 61 need not be provided, and further downsizing can be achieved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2024-074740, filed May 2, 2024, No. 2024-074741, filed May 2, 2024, and No. 2024-074742, filed May 2, 2024, which are hereby incorporated by reference herein in their entirety.

What is claimed is:

1. An image forming apparatus comprising:
an image bearing member;
a rotatable transfer member configured to be brought into contact with a surface of the image bearing member to form a transfer nip portion, and transfer, to a transfer material, toner supplied to the surface of the image bearing member, at the transfer nip portion;
an electrostatic charge removal member configured to remove electrostatic charge from a surface of the transfer member at a counter portion facing the surface of the transfer member at an upstream of the transfer nip portion in both a rotational direction of the transfer member and a moving direction of the transfer material; and
a transfer voltage application unit configured to apply a transfer voltage to the transfer member,
wherein the electrostatic charge removal member is arranged in such a manner as to remove electrostatic charge from the surface of the transfer member at the counter portion in a state in which the transfer voltage is applied to the transfer member.

2. The image forming apparatus according to claim 1, further comprising:
a drive unit configured to drive the image bearing member; and
a control unit configured to control the transfer voltage application unit and the drive unit,
wherein the control unit performs control in such a manner that, in an image formation operation of forming an image on a transfer material, the transfer voltage is applied to the transfer member in a state in which the transfer member is being rotated by the image bearing member being driven, and
wherein, in a case where the image formation operation is executed, the electrostatic charge removal member is arranged in such a manner that an absolute value of a surface potential of the transfer member at the counter portion is smaller than an absolute value of a surface potential of the transfer member at the transfer nip portion.

3. The image forming apparatus according to claim 2, wherein the transfer voltage in the image formation operation is set to a voltage at which electric discharge with the electrostatic charge removal member occurs.

4. The image forming apparatus according to claim 2,
wherein the control unit performs control in such a manner that the image formation operation, and a non-image formation operation in which no image is formed on the transfer material are executable,
wherein, in the non-image formation operation, the control unit performs control in such a manner as to apply the transfer voltage to the transfer member in a state in which the transfer member is being rotated by the image bearing member being driven, and
wherein the electrostatic charge removal member is arranged in such a manner that an absolute value of the surface potential of the transfer member at the counter portion is smaller than the absolute value of the surface potential of the transfer member at the transfer nip portion.

5. The image forming apparatus according to claim 4, wherein the non-image formation operation includes a pre-rotation operation to be executed before the image formation operation.

6. The image forming apparatus according to claim 4, wherein the non-image formation operation includes a post-rotation operation to be executed after the image formation operation.

7. The image forming apparatus according to claim 4, wherein, in a case where a first image formation operation and a second image formation operation which is executed after the first image formation operation are consecutively executed, the non-image formation operation is a paper-interval operation to be executed between the first image formation operation and the second image formation operation.

8. The image forming apparatus according to claim 1, further comprising, a counter member that is in contact with an inner surface of the image bearing member and faces the transfer member, wherein the transfer nip portion is formed by the image bearing member, the transfer member, and the counter member.

9. The image forming apparatus according to claim 1, wherein a polarity of the transfer voltage is opposite to a normal polarity of the toner.

10. The image forming apparatus according to claim 1, wherein, in a cross section orthogonal to a rotational axis of the transfer member, the electrostatic charge removal member is arranged in a region where the transfer member is arranged, out of regions defined by a tangent line of the transfer member and the image bearing member.

11. The image forming apparatus according to claim 1, wherein the electrostatic charge removal member is arranged at a position at which the electrostatic charge removal member does not contact the transfer member.

12. The image forming apparatus according to claim 1, wherein the electrostatic charge removal member includes an electrostatic charge eliminator.

13. The image forming apparatus according to claim 1, wherein the electrostatic charge removal member is arranged at a position at which the electrostatic charge removal member does not come into contact with the transfer material.

14. The image forming apparatus according to claim 1, wherein the electrostatic charge removal member forms the counter portion at an upstream, in the rotational direction of the transfer member, of a region where electric discharge occurs between the transfer member and the image bearing member.

15. The image forming apparatus according to claim 1, wherein the image bearing member is an intermediate transfer belt.

16. The image forming apparatus according to claim 1, wherein the image bearing member is a photosensitive drum.

17. The image forming apparatus according to claim 1, wherein a polarity of the transfer voltage is opposite to a normal polarity of the toner.

18. An image forming apparatus comprising:

an image bearing member;

a rotatable transfer member configured to be brought into contact with a surface of the image bearing member to form a transfer nip portion, and transfer, to a recording material, toner supplied to the surface of the image bearing member, at the transfer nip portion;

a conveyance guide configured to guide the recording material to be conveyed to the transfer nip portion, the conveyance guide including a guide portion configured to guide conveyance of the recording material to the transfer nip portion by being brought into contact with a surface opposite to a surface of the recording material to which toner is to be transferred;

an electrostatic charge removal portion configured to remove electrostatic charge from a surface of the transfer member at a counter portion facing the surface of the transfer member at an upstream of the transfer nip portion in both a rotational direction of the transfer member and a moving direction of the recording material; and a transfer voltage application unit configured to apply a transfer voltage to the transfer member, wherein the electrostatic charge removal portion removes electrostatic charge from the surface of the transfer member at the counter portion in a state in which the transfer voltage is applied to the transfer member.

19. The image forming apparatus according to claim 18, wherein the electrostatic charge removal portion comes into contact with the transfer member at the counter portion.

20. The image forming apparatus according to claim 18, wherein the electrostatic charge removal portion does not come into contact with the transfer member at the counter portion.

21. The image forming apparatus according to claim 18, wherein, in a cross section orthogonal to a rotational axis of the transfer member, the guide portion is arranged in a region where the image bearing member is arranged, out of regions defined by a tangent line of the transfer nip portion.

22. The image forming apparatus according to claim 21, wherein the conveyance guide further includes an inclined guide portion that is inclined toward the transfer member, from the guide portion, and wherein a downstream end of the inclined guide portion in a conveyance direction of the recording material is arranged in a region where the transfer member is arranged, out of regions defined by the tangent line of the transfer nip portion.

23. The image forming apparatus according to claim 18, further comprising:

a counter member that is in contact with an inner surface of the image bearing member and faces the transfer member, wherein the transfer nip portion is formed by the image bearing member, the transfer member, and the counter member.

24. The image forming apparatus according to claim 18, wherein, in a cross section orthogonal to a rotational axis of the transfer member, the electrostatic charge removal portion is arranged in a region where the transfer member is arranged, out of regions defined by a tangent line of the transfer member and the image bearing member.

25. The image forming apparatus according to claim 18, wherein the electrostatic charge removal portion includes an electrostatic charge eliminator.

26. The image forming apparatus according to claim 18, wherein the transfer voltage is set to a voltage at which electric discharge with the electrostatic charge removal portion occurs.

27. The image forming apparatus according to claim 18, wherein the electrostatic charge removal portion forms the counter portion at an upstream, in a rotational direction of the transfer member, of a region where electric discharge occurs between the transfer member and the image bearing member.

28. The image forming apparatus according to claim 18, wherein the image bearing member is an intermediate transfer belt.

29. The image forming apparatus according to claim 18, wherein the image bearing member is a photosensitive drum.

30. An image forming apparatus comprising:

an image bearing member;

a rotatable transfer member configured to be brought into contact with a surface of the image bearing member to form a transfer nip portion, and transfer, to a recording material, toner supplied to the surface of the image bearing member, at the transfer nip portion;

an electrostatic charge removal member configured to remove electrostatic charge from a surface of the transfer member at a counter portion facing the surface of the transfer member at an upstream of the transfer nip portion in both a rotational direction of the transfer member and a moving direction of the recording material; and a guide member configured to guide conveyance of the recording material to the transfer nip portion by being brought into contact with a surface opposite to a surface of the recording material to which toner is to be transferred; and a transfer voltage application unit configured to apply a transfer voltage to the transfer member, wherein the guide member and the electrostatic charge removal member are grounded via a same current suppression circuit, and wherein the electrostatic charge removal member removes electrostatic charge from the surface of the transfer member at the counter portion in a state in which the transfer voltage is applied to the transfer member.

31. The image forming apparatus according to claim 30, wherein the electrostatic charge removal member comes into contact with the transfer member at the counter portion.

32. The image forming apparatus according to claim 31, wherein the transfer voltage is set to a voltage at which electric discharge with the electrostatic charge removal member occurs.

33. The image forming apparatus according to claim 30, wherein the electrostatic charge removal member does not come into contact with the transfer member at the counter portion.

34. The image forming apparatus according to claim 30, wherein the current suppression circuit is a variable resistance circuit.

35. The image forming apparatus according to claim 34, further comprising:

a humidity detection unit configured to detect information regarding a humidity; and a control unit configured to control the current suppression circuit based on a detection result of the humidity detection unit, wherein the control unit performs control in such a manner as to switch a resistance value of the variable resistance circuit based on the detection result.

36. The image forming apparatus according to claim 30, wherein the current suppression circuit is a constant-voltage element.

37. The image forming apparatus according to claim 36, wherein the constant-voltage element is a Zener diode.

38. The image forming apparatus according to claim 30, wherein a current amount of the current suppression circuit is suppressed more in a case of transferring the toner image on the image bearing member to a second recording material with a resistance lower than that of a first recording material, than in a case of transferring the toner image on the image bearing member to the first recording material.

39. The image forming apparatus according to claim 30, wherein the guide member also serves as the electrostatic charge removal member.

40. The image forming apparatus according to claim 30, further comprising:

a counter member that is in contact with an inner surface of the image bearing member and faces the transfer member, wherein the transfer nip portion is formed by the image bearing member, the transfer member, and the counter member.

41. The image forming apparatus according to claim 30, wherein a polarity of the transfer voltage is opposite to a normal polarity of the toner.

42. The image forming apparatus according to claim 30, wherein, in a cross section orthogonal to a rotational axis of the transfer member, the electrostatic charge removal member is arranged in a region where the transfer member is arranged, out of regions defined by a tangent line of the transfer member and the image bearing member.

43. The image forming apparatus according to claim 30, wherein the electrostatic charge removal member includes an electrostatic charge eliminator.

44. The image forming apparatus according to claim 30, wherein the electrostatic charge removal member forms the counter portion at an upstream, in the rotational direction of the transfer member, of a region where electric discharge occurs between the transfer member and the image bearing member.

45. The image forming apparatus according to claim 30, wherein the image bearing member is an intermediate transfer belt.

46. The image forming apparatus according to claim 30, wherein the image bearing member is a photosensitive drum.

* * * * *